United States Patent
Mammen et al.

(10) Patent No.: US 7,339,943 B1
(45) Date of Patent: Mar. 4, 2008

(54) APPARATUS AND METHOD FOR QUEUING FLOW MANAGEMENT BETWEEN INPUT, INTERMEDIATE AND OUTPUT QUEUES

(75) Inventors: Neil Mammen, San Jose, CA (US); Greg Maturi, San Jose, CA (US); Mammen Thomas, San Jose, CA (US)

(73) Assignee: Altera Corporation, San Jose, CA (US)

( * ) Notice: Subject to any disclaimer, the term of this patent is extended or adjusted under 35 U.S.C. 154(b) by 718 days.

(21) Appl. No.: 10/144,092

(22) Filed: May 10, 2002

(51) Int. Cl.
*H04L 12/54* (2006.01)
(52) U.S. Cl. ..................................... 370/414; 370/423
(58) Field of Classification Search ................ 370/389, 370/471, 225, 228, 235; 379/266.04; 719/314
See application file for complete search history.

(56) References Cited

U.S. PATENT DOCUMENTS

| | | | |
|---|---|---|---|
| 4,131,762 A * | 12/1978 | Reid | 370/370 |
| 4,710,966 A | 12/1987 | Aufiero et al. | |
| 4,893,302 A | 1/1990 | Hemmady et al. | |
| 5,257,395 A | 10/1993 | Li | |
| 5,398,315 A | 3/1995 | Johnson et al. | |
| 5,400,288 A | 3/1995 | Hashimoto et al. | |
| 5,541,852 A | 7/1996 | Eyuboglu et al. | |
| 5,598,408 A | 1/1997 | Nickolls et al. | |
| 5,696,719 A | 12/1997 | Baek et al. | |
| 5,715,437 A * | 2/1998 | Baker et al. | 345/519 |
| 5,742,180 A | 4/1998 | Dehon et al. | |
| 5,796,719 A | 8/1998 | Peris et al. | |
| 5,805,816 A | 9/1998 | Picazo et al. | |
| 5,831,971 A | 11/1998 | Bonomi et al. | |
| 5,898,689 A | 4/1999 | Kumar et al. | |
| 6,018,612 A | 1/2000 | Thomason et al. | |

(Continued)

FOREIGN PATENT DOCUMENTS

WO    WO 99/13397    3/1999

(Continued)

OTHER PUBLICATIONS

Minkenberg, C (Work-conservingness of CIOQ packet switches with limited output buffers; Communications Letters, IEEE☐☐vol. 6, Issue 10, Oct. 2002 pp. 452-454)☐☐.*

(Continued)

*Primary Examiner*—Edan D. Orgad
*Assistant Examiner*—Salman Ahmed
(74) *Attorney, Agent, or Firm*—Martine Penilla & Gencarella, LLP

(57) ABSTRACT

An apparatus is described that includes a plurality of queuing paths. Each of the queuing paths further comprises an input queue, an intermediate queue and an output queue. The input queue has an output coupled to an input of the intermediate queue and the input of the output queue. The intermediate queue has an output coupled to the input of the output queue. The intermediate queue receives data units from the input queue if a state of the input queue has reached a threshold. The output queue receives data units from the intermediate queue if the intermediate queue has data units. The output queue receives data units from the input queue if the intermediate queue does not have data units.

21 Claims, 12 Drawing Sheets

U.S. PATENT DOCUMENTS

| | | | |
|---|---|---|---|
| 6,047,304 A | 4/2000 | Ladwig et al. |
| 6,163,539 A | 12/2000 | Alexander et al. |
| 6,226,338 B1 | 5/2001 | Earnest et al. |
| 6,275,507 B1 | 8/2001 | Anderson et al. |
| 6,377,071 B1 * | 4/2002 | Wang et al. | 326/46 |
| 6,377,546 B1 | 4/2002 | Guerin et al. |
| 6,377,587 B1 | 4/2002 | Grivan |
| 6,389,468 B1 | 5/2002 | Muller et al. |
| 6,425,064 B2 * | 7/2002 | Soderquist | 711/171 |
| 6,438,145 B1 | 8/2002 | Moshovich et al. |
| 6,487,202 B1 | 11/2002 | Klausmeier et al. |
| 6,721,271 B1 | 4/2004 | Beshai et al. |
| 6,738,880 B2 | 5/2004 | Lai et al. |
| 6,757,897 B1 | 6/2004 | Shi et al. |
| 6,782,470 B1 | 8/2004 | Berg et al. |
| 6,804,815 B1 | 10/2004 | Kerr et al. |
| 6,823,409 B2 | 11/2004 | Jones et al. |
| 6,910,092 B2 | 6/2005 | Calvignac et al. |
| 6,915,480 B2 | 7/2005 | Calle et al. |
| 6,973,036 B2 | 12/2005 | Goetzinger et al. |
| 6,982,986 B2 | 1/2006 | Goetzinger et al. |
| 6,985,964 B1 | 1/2006 | Petersen et al. |
| 6,987,760 B2 | 1/2006 | Calvignac et al. |
| 7,002,965 B1 | 2/2006 | Cheriton |
| 7,050,440 B2 * | 5/2006 | Colmant et al. | 370/395.1 |
| 7,110,400 B2 | 9/2006 | Hronik |
| 7,206,857 B1 | 4/2007 | Mammen et al. |
| 2001/0049744 A1 | 12/2001 | Hussey et al. |
| 2002/0044559 A1 | 4/2002 | Ardalan et al. |
| 2002/0048270 A1 | 4/2002 | Allen, Jr. et al. |
| 2002/0050959 A1 * | 5/2002 | Buckelew et al. | 345/55 |
| 2002/0071321 A1 | 6/2002 | Barrie et al. |
| 2002/0099900 A1 | 7/2002 | Kawarai et al. |
| 2002/0101867 A1 * | 8/2002 | O'Callaghan et al. | 370/389 |
| 2002/0122424 A1 | 9/2002 | Kawarai et al. |
| 2002/0126672 A1 | 9/2002 | Chow et al. |
| 2002/0126710 A1 | 9/2002 | Bergenwall et al. |
| 2002/0145974 A1 | 10/2002 | Saidi et al. |
| 2002/0163935 A1 | 11/2002 | Paatela et al. |
| 2002/0169921 A1 | 11/2002 | Saitoh |
| 2003/0012209 A1 | 1/2003 | Abdelilah et al. |
| 2003/0053460 A1 | 3/2003 | Suda et al. |
| 2003/0063348 A1 | 4/2003 | Posey et al. |
| 2003/0067930 A1 | 4/2003 | Salapura et al. |
| 2003/0088671 A1 | 5/2003 | Klinker et al. |
| 2003/0099194 A1 | 5/2003 | Lee et al. |
| 2003/0103507 A1 | 6/2003 | Lynch et al. |
| 2003/0112802 A1 | 6/2003 | Ono et al. |
| 2003/0189932 A1 | 10/2003 | Ishikawa et al. |
| 2003/0193936 A1 | 10/2003 | Wolkrich et al. |
| 2003/0214948 A1 | 11/2003 | Jin et al. |
| 2004/0066804 A1 | 4/2004 | Holma |
| 2005/0025140 A1 | 2/2005 | Deforche et al. |

FOREIGN PATENT DOCUMENTS

WO     WO 9913397 A1 *    3/1999

OTHER PUBLICATIONS

Tobagi, F.A.(Fast packet switch architectures for broadband integrated services digital networks; Proceedings of the IEEE□□vol. 78, Issue 1, Jan. 1990 pp. 133-167)□□.*

Medlin, J. (The Prevention of Transmission Buffer Overflow in Telemetry Data Compressors; Communications, IEEE Transactions on [legacy, pre—1988] vol. 16, Issue 1, Feb. 1968 pp. 94-107□□.*

U.S. Appl. No. 10/151,774, filed May 20, 2002, Mammen et al.
U.S. Appl. No. 10/144,387, filed May 10, 2002, Maturi et al.
U.S. Appl. No. 10/153,137, filed May 20, 2002, Mammen et al.
U.S. Appl. No. 10/151,775, filed May 20, 2002, Mammen et al.
U.S. Appl. No. 10/144,091, filed May 10, 2002, Maturi et al.

* cited by examiner

| INPUT QUEUE | INPUT QUEUE STATE |
|---|---|
| 1 | A |
| 2 | B |
| 3 | C |
| 4 | D |
| ⋮ | ⋮ |
| N | E |

695

| INTER-MEDIATE QUEUE | NON-EMPTY STATE |
|---|---|
| 1 | 1 |
| 2 | 0 |
| 3 | 1 |
| 4 | 0 |
| ⋮ | ⋮ |
| N | 1 |

696

| OUTPUT QUEUE | OUTPUT QUEUE STATE |
|---|---|
| 1 | F |
| 2 | G |
| 3 | H |
| 4 | I |
| ⋮ | ⋮ |
| N | J |

QUEUE STATES UNIT
670c

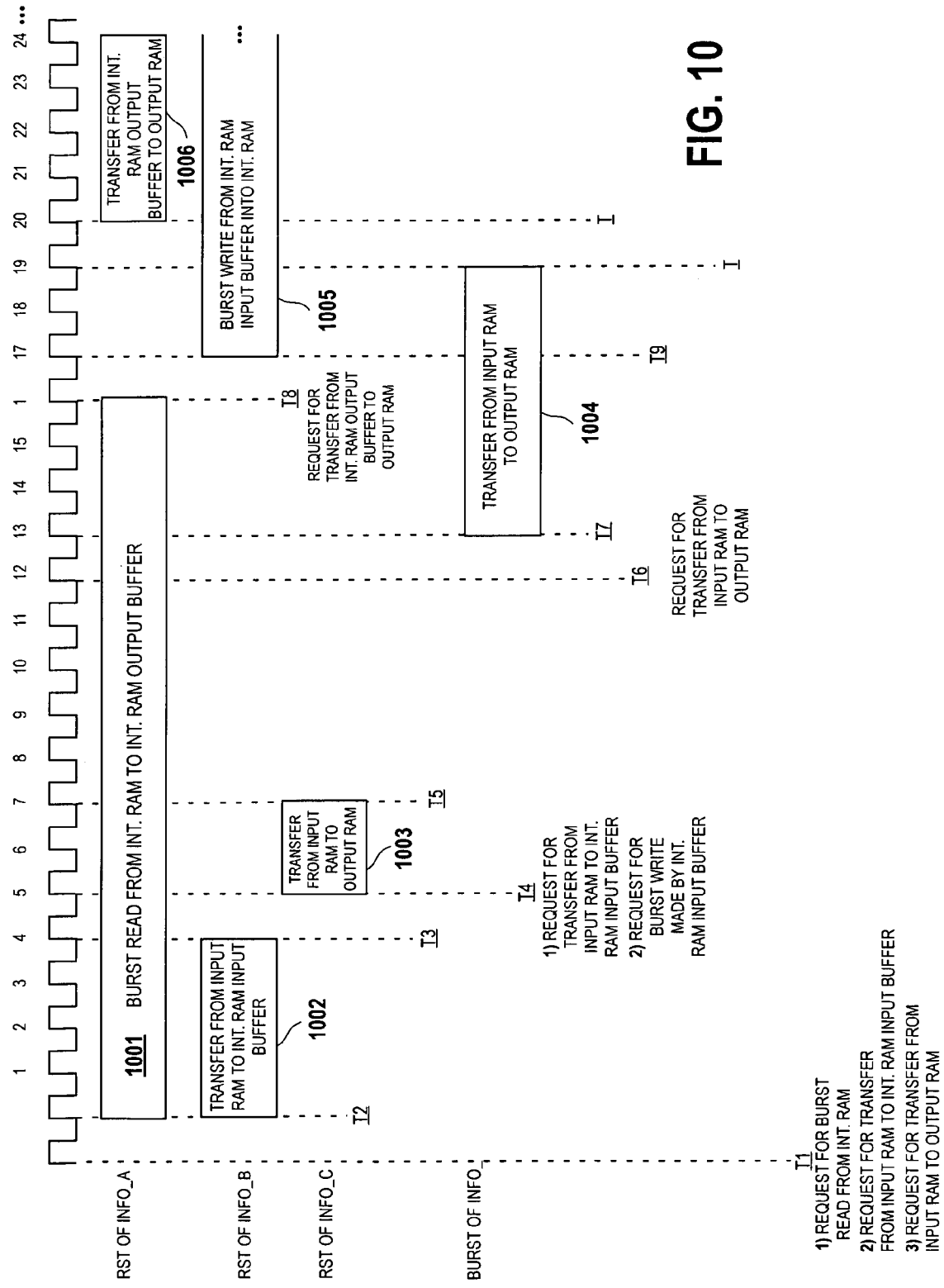

APPARATUS AND METHOD FOR QUEUING FLOW MANAGEMENT BETWEEN INPUT, INTERMEDIATE AND OUTPUT QUEUES

FIELD OF INVENTION

The field of invention relates generally to electronic circuitry; and, more specifically, to an apparatus and method for queuing flow management between input, intermediate and output queues.

BACKGROUND

1.0 Basic Networking Tasks

A networking hardware machine (e.g., a switch, a router, etc.) is usually designed to perform one or more basic networking tasks. One basic networking task may include a look-up, based upon a packet's header information, that classifies the packet. Another basic networking task is the management and implementation of one or more queues that can temporarily hold a packet (or at least a portion of a packet, or a control header that describes where a packet payload can be found in a memory device). FIG. 1 shows an example of a networking hardware line interface card (LIC) or "blade" $101_1$ that is designed to perform both of the aforementioned functions.

Note that the LIC $101_1$ also resides, as drawn within FIG. 1, within a networking hardware machine 100 such as a switch or router. In typical embodiments, the LIC $101_1$ receives "ingress" packets from a fiber optic or copper cable $109_1$ and also transmits "egress" packets over another fiber optic or copper cable $108_1$. Ingress/Egress circuitry 102 manages the physical reception and transmission of packets from/to the ingress/egress cables $109_1/108_1$. As such, in the ingress direction, the ingress/circuitry 102 provides (e.g., along interface 113) a stream of data units (e.g., bytes, cells, words, etc.) to the network processing logic 103 that, together, represent one or more packets.

According to one design approach the ingress/circuitry 102 also performs packet delineation (i.e., the recognition of where a packet "starts" and/or "ends") whereas, in another design approach, the network processing logic 102 performs packet delineation. Regardless, once the starting and/or ending point of a packet is recognized, the packet's header can be identified; and, subsequently, information that resides within the packet header can be used to perform a look-up. Network processing logic 103 is responsible for understanding the organization of the packet's header so that at least a portion of it (e.g., its source address, its source port, its destination address, its destination port, a connection identifier, a classification identifier, some combination of any or all of these, etc.) can be used as a basis for performing a look-up. In various embodiments, a search key is formed by the networking processing logic 102 from the specific packet header information.

The search key, which acts as a look-up input parameter, is then presented to a look-up resource 104. The look-up resource 104 stores information that is used to classify a packet so that the networking hardware machine 100 can treat the packet in an appropriate fashion. The look-up resource 104 can be implemented with a content addressable memory (CAM); and/or, a traditional memory such as a Static Random Access Memory (SRAM) or Dynamic Random Access Memory (DRAM).

The look-up process may be performed, for each packet, with a single look-up (where the information that is used to help treat the packet appropriately is retrieved as an immediate response to the search key); or, alternatively a series of look-ups (e.g., a first look-up is performed from the search key to retrieve a reference value which; in turn, is used as a look-up parameter for a second look-up that produces the information used as guidance for treating the packet). The look-up resource 104 illustration of FIG. 1 is meant to generally depict any and/or all of the look-up resource devices used for the one or more look-ups that are performed. Furthermore, the interface between the network processing logic 103 and the look-up resource 104 may be bi-directional (as suggested by interface 110).

According to at least one approach, the information provided by the information resource 104 identifies which queuing path (amongst the plurality of queues 105) the packet is to be processed according to. Here, for example, certain queuing paths may be given unique rates of service as a vehicle for providing differentiated services to the packets that arrive to the networking machine 100. That is, for example, ingress packets that should experience reduced latency through the machine 100 (e.g., packets associated with a real time application such as a voice conversation or a video conference) may be placed into a queuing path that receives a high bandwidth rate of service; and, ingress packets that can experience a greater amount of latency through the machine (e.g., packets associated with a traditional data communication such as an email or an file transfer) may be placed in a queuing path that receives a low bandwidth rate of service.

The queuing paths of FIG. 1 have been grouped together (as queue(s) 105) for illustrative convenience. According to one approach, the "entire" packet (e.g., header and payload) is entered into its appropriate queuing path by the network processing logic 102. According to another approach, at least the payload of each ingress packet is stored into a separate memory device (not shown in FIG. 1 for simplicity) and a control header (e.g., a data structure that indicates where the packet payload may be found in the aforementioned memory device) is entered into its appropriate queuing path instead. For simplicity, either approach may be referred to as entering a packet into a queuing path.

Typically, after a packet is submitted into one of the queuing paths represented by queue(s) 105, it is eventually transported through the switching/routing circuitry 106 to another LIC (e.g., any of LICs $101_2$ though $101_N$) from where it is transmitted as an egress packet (e.g., along the LICs corresponding egress cable (e.g., cable $108_2$ for LIC $101_2$, etc., . . . , cable $108_N$ for LIC $101_N$)). Note that if only a control header is entered into one of the ingress queues 105, it may be passed to the appropriate egress LIC; which, subsequently, uses the control header to fetch the packet (or whatever portion of the packet is needed to complete the packet). According to at least one design approach, the switching/routing circuitry 106 may direct the packet to the appropriate LIC based upon information that was retrieved from the look-up (e.g., the look-up performed by the network processing logic 102 may also produce an indication as to which LIC $101_1$ through $101_N$ the packet is to be directed to). According to an alternative design approach, the switching/routing circuitry 106 "makes a decision" based upon the packet's header information.

2.0 Burst Write into Memory and Burst Read from Memory

FIG. 2a shows a Random Access Memory (RAM) unit 201 (e.g., a DRAM or SRAM). RAM memory units are traditionally managed by some form of control unit 202 (e.g., memory controller) that: 1) supplies addressing information (over address bus 203) to the RAM memory unit 201; and, 2) receives/sends data information from/to the memory unit 201 (over data bus 204). A "read operation" or a "read" are terms used to refer to the process by which data information is read from the RAM memory unit 201; and, a "write operation" or a "write" is a term used to refer to the process by which data information is written into the RAM memory unit 201.

According to traditional system design approaches, a system 205 that uses the RAM memory unit 201 (e.g., by sending write data along (and receiving read data from) system data bus 207) must supply an address to the control unit 202 (e.g., along system address bus 206) for each write operation and each read operation that is performed by the RAM memory unit 201. FIG. 2b shows the timing associated with such an approach. Here, at a first cycle 211, a first address 250 is provided to the control unit 202 by the system 205. At a second cycle 212, the address 250 is provided to the RAM memory unit 201 by the control unit 202 and information is read from or written into the RAM memory (depending on whether the operation desired by the system 205 is a write operation or a read operation). Here, as two cycles 211, 212 are consumed in performing a read or write operation, eight cycles will be consumed performing four consecutive read and/or write operations.

FIG. 2c shows an improved technique wherein accesses to the memory unit 201 are organized into "bursts" of accesses per address supplied by the system 205. Again, at a first cycle 221, a first address is provided to the control unit 202 by the system 205. In response, by comparison, a burst of four consecutive read or write operations (depending on whether the operation desired by the system 205 is a write operation or a read operation) is performed by the control unit 202 and RAM memory unit 201. As such, whereas eight cycles where consumed according to the approach of FIG. 2b, only five cycles are consumed according to the approach of FIG. 2c to perform the same number of read or write operations.

Here, the system 205 and control unit 202 can be designed with the understanding that the system 205 need only supply addresses to the control unit in the form of X . . . X00 (here each X can be either a 1 or a 0). Better said, the address supplied by the system 205 has its lowest ordered pair of bits set to "00". Upon receipt of an address 251 from the system 205 by the control unit 202 (e.g., as drawn at the first cycle 221 of FIG. 2c), the control unit 202 applies this address 251 when actually addressing the memory unit 201 during the second cycle 222. However, during the third cycle 223 the control unit 202 automatically applies an address 252 of X . . . X01; during the fourth cycle 224 the control unit 202 automatically applies an address 253 of X . . . X10; and during the fifth cycle 225 the control unit 202 automatically applies an address 254 of X . . . X11.

Thus, the control unit 202 and system 205 have been designed with the understanding that memory accesses are performed in four cycle "bursts". As such, the system 205 need not provide address values beneath a resolution of four; and, the control unit 202 is designed to automatically increment the address value 251 supplied by the system 202 with three increments (in one bit increments) over the course of the three cycles 223-225 following the cycle 222 where the address value 251 from the system has been applied to the RAM memory unit 201. Note that, from embodiment to embodiment, the number of accesses per burst may be other than four; and, each cycle may be timed in accordance with one or more clock cycles. Furthermore, the RAM memory unit 201 may be multi ported (e.g., more than one data and address bus) rather than single ported as seen in FIG. 2a.

FIGURES

The present invention is illustrated by way of example, and not limitation, in the Figures of the accompanying drawings in which:

FIG. 6c shows an embodiment of a queue states unit.

FIG. 10 shows a timing diagram that describes an embodiment of the manner in which the Queuing Flow Management unit of FIGS. 4 and 5 can orchestrate the flow of information through the memory units depicted therein.

DESCRIPTION

A. Queuing Implementation

Figure 1:
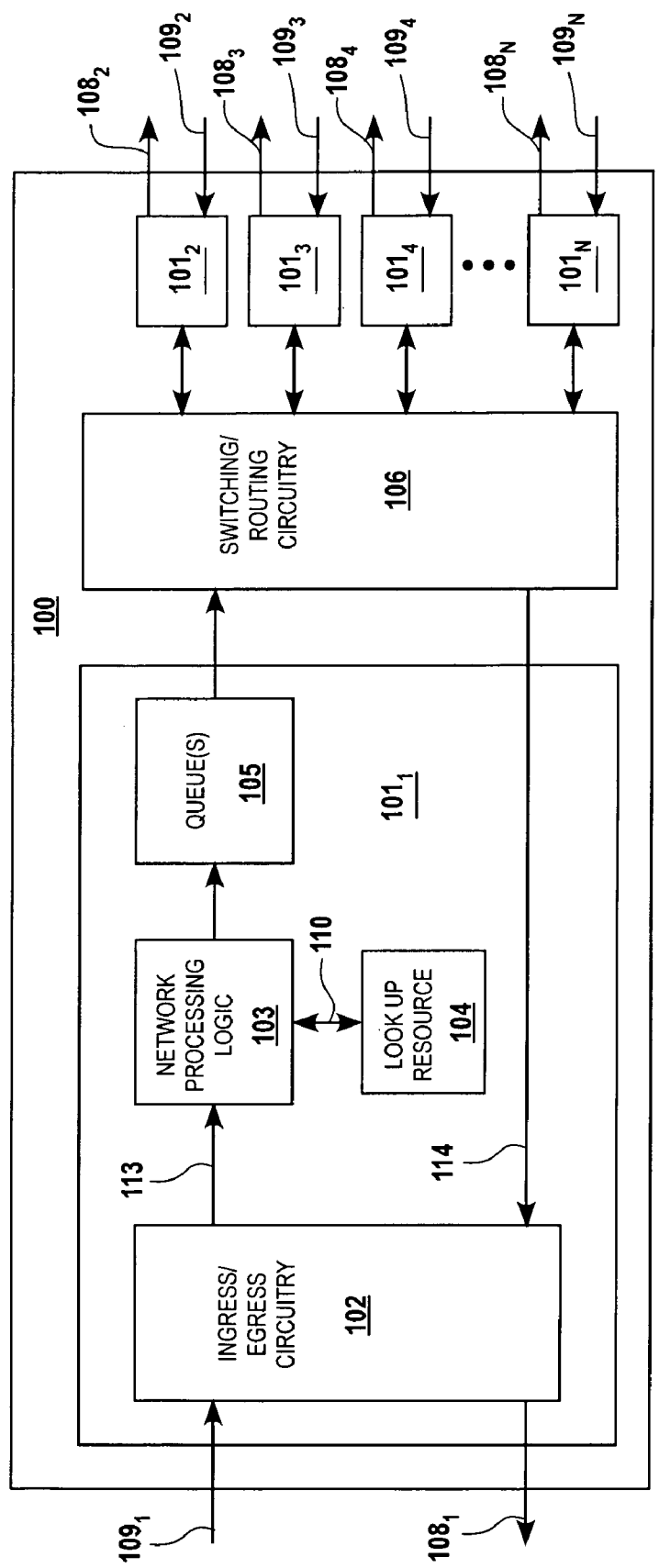
FIG. 1 shows an embodiment of a networking hardware machine.
Figure 3:
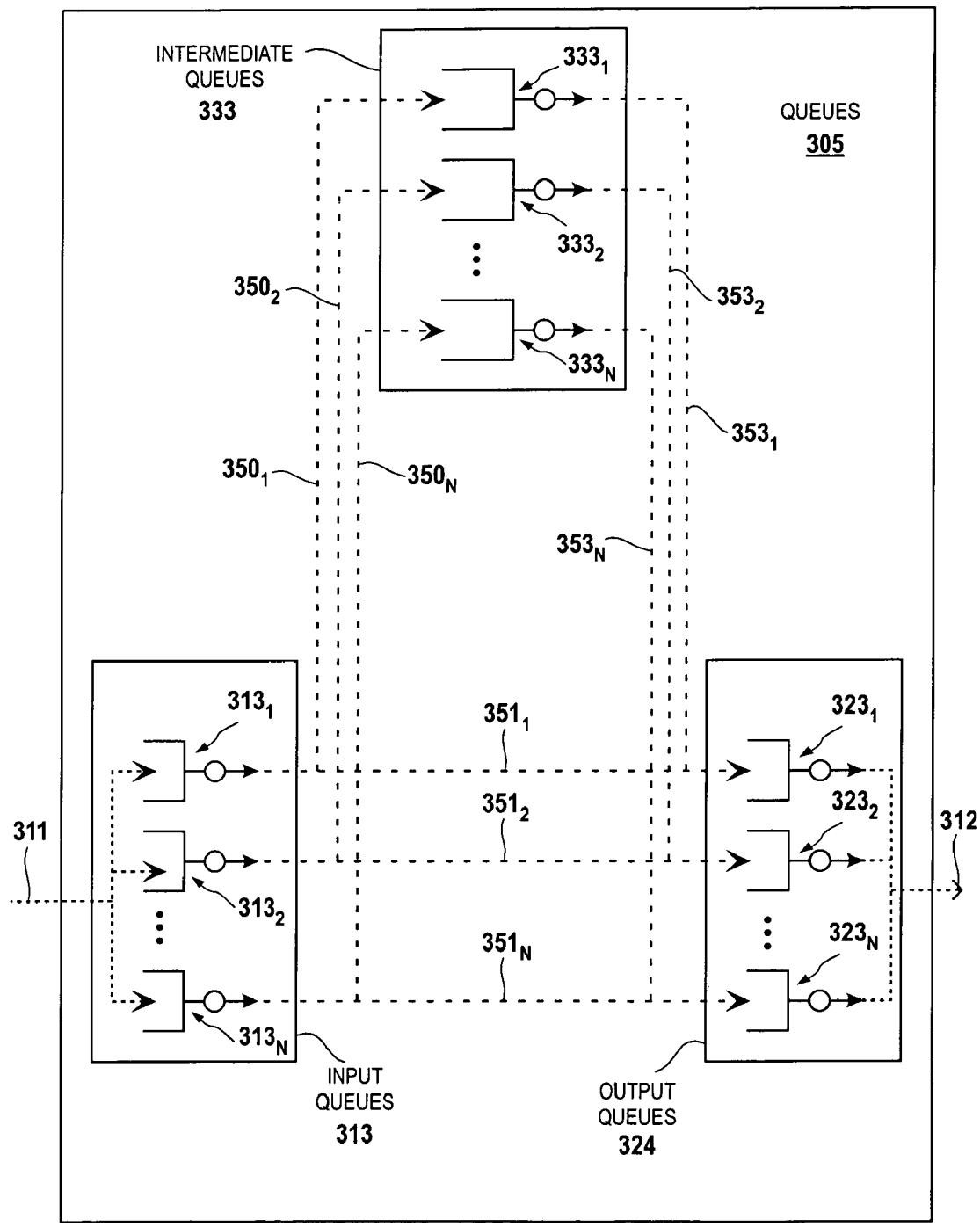
FIG. 3 shows an embodiment of a queuing structure that may be used to implement the plurality of queues 105 shown in FIG. 1.

FIG. 3 shows an embodiment of a queuing structure that may be used to implement the plurality of queues 105 shown in FIG. 1. Here, three queuing groups are observed. A first queuing group 313 includes a plurality of "input" queues $313_1$ through $313_N$. A second queuing group 323 includes a plurality of "output" queues $323_1$ through $324_N$. A third queuing group 333 includes a plurality of "intermediate" queues $333_1$ through $333_N$.

Each queue may be viewed as belonging to particular queuing path. A data unit (e.g., a packet, a portion of a packet, a control header, etc.) travels along a particular queuing path so that it experiences an amount of delay that is consistent with the bandwidth resources allocated for the particular queuing path and the amount of data traffic the particular queuing path is asked to handle. Here, data units that are queued along the nth queuing path: 1) enter the nth queuing path by being placed into the nth input queue $313_n$; 2) leave the nth queuing path by being serviced from the nth output queue $323_n$; and, 3) are placed into the nth intermediate queue only under higher loading conditions when the amount of data being queued by the nth queuing path is greater than some threshold value.

As a few examples, the n=1 queuing path may be viewed as being comprised of input queue $313_1$, output queue $323_1$, intermediate queue $333_1$, and queuing channels $350_1$, $351_1$ and $352_1$; the n=2 queuing path may be viewed as being comprised of input queue $313_2$, output queue $323_2$, intermediate queue $333_2$, and queuing channels $350_2$, $351_2$ and $352_2$; . . . ; and, the n=N queuing path may be viewed as being comprised of input queue $313_N$, output queue $323_N$, intermediate queue $333_N$, and queuing channels $350_N$, $351_N$ and $352_N$. Certain queuing paths may be given unique rates of service (and/or queuing depths) as a vehicle for providing differentiated services to the data units that are to be processed by the queuing approach of FIG. 3.

That is, for example, packets that should experience reduced latency (e.g., packets associated with a real time application such as a voice conversation or a video conference) may have their corresponding data units placed along a queuing path that receives a high bandwidth rate of service; and, packets that can experience a greater amount of latency (e.g., packets associated with a traditional data communication such as an email or an file transfer) may have their corresponding data units placed along a queuing path that receives a low bandwidth rate of service. As such, in order to provide as many as "n" unique degrees of networking service, "n" queuing paths have been built into the queuing approach of FIG. 3.

According to a queuing approach of FIG. 3, an intermediate queue begins to be used only if the amount of data being queued by the queuing path is greater than the combined depth of the queuing path's input queue and output queue. In order to illustrate such an instance, consider a continuous stream of data units that are provided to a particular queuing path (e.g., the n=1 queuing path) that is initially "empty" (in the sense that none of its queues have any data units). Here, when some of the first data units that were entered into the input queue $313_1$ are serviced from the input queue $313_1$, they will be sent to the output queue $323_1$ (along queuing channel $351_1$) and not to the intermediate queue $333_1$ because the output queue $323_1$ (being initially empty) will have a sufficient amount of queuing room to store these data units.

If the output queue $323_1$ is not serviced (e.g., the switching or routing circuitry that receives data units from the output queue $323_1$ is busy servicing other output queues), data units will continually be sent directly to the output queue $323_1$ until the output queue $323_1$ "fills up". Once the output queue "fills up", packets will continually be stored into the input queue $313_1$ until the state of the input queue $313_1$ (i.e., the total amount of data being stored in the input queue $313_1$) reaches a threshold. In an embodiment, as described in more detail below, the threshold corresponds to an amount of data needed to perform a burst write into a random access memory.

Once the state of the input queue $313_1$ reaches its threshold, data units begin to be stored into the intermediate queue $333_1$ (rather than stored into the output queue $323_1$) in order to "offload" the storage pressure being exerted upon the input queue $313_1$ as a result of the continuous stream of data units being entered into the input queue $313_1$ (from input 311) and the "filled" status of the output queue $323_1$. As such, the data units begin to travel along queuing channel $350_1$ rather than queuing channel $351_1$. In a further embodiment, each time the state of the input queue $313_1$ reaches its threshold and the output queue $323_1$ is not ready to entertain acceptance of the input queue's data, another threshold worth of data is transferred from the input queue $313_1$ to the intermediate queue.

Once data units have begun to be stored into the intermediate queue $333_1$, in order to preserve First-In-First-Out (FIFO) queuing of the queuing path, data units are removed from the intermediate queue 333 as space becomes available in the output queue $323_1$ (e.g., if the output queue $323_1$ suddenly begins to be serviced such that it is no longer "filled"). That is, whenever the output queue $323_1$ has room to accept more data units, the data units are transferred from the intermediate queue $333_1$ along queuing channel $352_1$ (rather than being transferred from the input queue $313_1$ along queuing channel $351_1$). This activity continues until the intermediate queue $333_1$ becomes empty; at which point, transfers of data units from the input queue $313_1$ to the output queue $333_1$ (along queuing channel $351_i$) can once again begin to be entertained.

B. Memory Usage Strategy for Queuing Implementation

Figure 4:
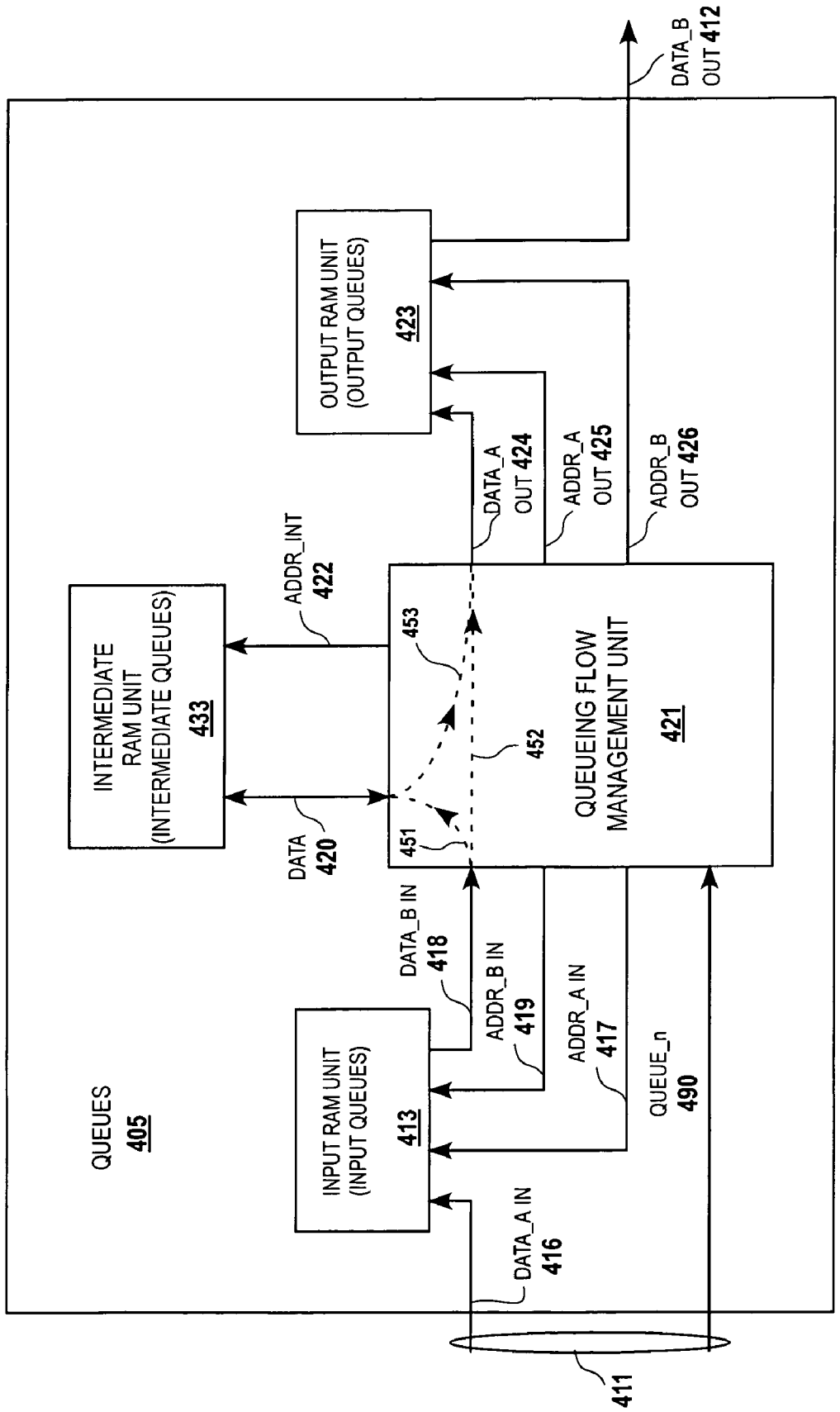
FIG. 4 shows an embodiment of a memory management architecture for implementing the queuing design of FIG. 3.

FIG. 4 shows an embodiment of an electronic circuit design that may be used to implement a queuing approach as described just above with respect to FIG. 3. According to the electronic circuit design of FIG. 4, each set of queues is implemented with a separate random access memory (RAM). That is, referring to FIGS. 3 and 4, the input queues 313 are implemented with a first "input" RAM 413; the output queues 323 are implemented with a second "output" RAM 423; and, the intermediate queues 333 are implemented with a third "intermediate" RAM 433.

A queue is a temporary holding facility for a data unit. Queues are often constructed with Random Access Memory (RAM) circuits or shift-register type circuits. When multiple queues are to be implemented within the same RAM circuit, according to one type of approach, specific address regions are reserved for a particular queue (e.g., for a RAM having a plurality of queues each having 16 separately addressable regions, a first queue is associated with address regions 00 . . . 00XXXX; a second queue is associated with address regions 00 . . . 01XXXX; a third queue is associated with address regions 00 . . . 10XXXX;, etc. where each X can be either a 0 or a 1). Accordingly, this type of approach may be referred to as a fixed addressing approach.

According to another type of approach, link lists are used. Link lists effectively "link" data units in the same queue by including a pointer with a first data unit that points to the address where a second data unit in the same queue may be found. As such, link lists typically allow a particular queue's addressing space to vary over the course of its lifetime. Typically a link list table, which identifies which regions of a RAM are "free" to be written to, are used to identify where a data unit is to be stored. The use of link lists makes it easier to implement "configurable" queues whose depth can be programmed in software.

Depending on user preference, each of the RAMs 413, 423, 433 of FIG. 4 may be implemented with either type of queuing approach described just above (as well as other types of approaches to the extent they exist). However, in at least one type of approach, fixed addressing space is used to implement the input queues within the input and output RAMs 413, 423, whereas link lists are used to implement the intermediate queues within the intermediate RAM 433. In a further embodiment, the depth of the intermediate queues (which corresponds to how much information each can store) is therefore made to be configurable in software.

The queuing flow management unit 421 is responsible for implementing the appropriate flow of data units amongst the RAMs 413, 423, 433 consistent with the queuing strategy being implemented. Better said, referring to FIGS. 3 and 4, the queuing flow management unit 421 effectively implements each of the queuing channels $350_1$ through $350_N$, $351_1$ through $351_1$, and $352_1$ through $352_N$ (e.g., by transporting data units from queue to queue). Here, the queuing flow management unit 421 is comprised of: 1) a first data path 451 that helps to transport data units from the input RAM 413 to the intermediate RAM 433 (and, by so doing, effectively implements queuing channels $350_1$ through $350_N$ of FIG. 3); 2) a second data path 452 that helps to transport data units from the input RAM 413 to the output RAM 423 (and, by so doing, effectively implements queuing channels $351_1$ through $351_N$ of channel 3); and 3) a third data path 453 that helps to transport data units from the intermediate RAM 433 to the output RAM 423 (and, by so doing, effectively implements queuing channels $352_1$ through $352_N$ of channel 3). A data path is any combination of circuitry and/or signal line(s) between a pair of locations that transports information from a first of the locations to a second of the locations.

In various embodiments, the queuing flow management unit 421 may also be designed to recognize queuing conditions that trigger the use of a particular queuing channel/data path. For example, referring back to FIG. 3, where n can be any integer between 1 and N inclusive, whether the nth output queue $323_n$ is full—which triggers the use of queuing channel $350_n$; whether the nth intermediate queue $333_n$ is non empty—which triggers the use of queuing channel $352_n$; and, whether the state of the nth input queue $313_n$ has reached its threshold—which triggers the use of queuing channel $351_n$).

Note that data units destined for a particular input queue $313_n$ effectively enter the queue by being written into memory 413 via the ADDR_A IN address bus 417 and the DATA_A IN data bus 416. According to the approach of FIG. 4, the data unit to be enqueued is presented at the DATA_A IN data bus 416 along with an indication of the input queue into which it is to be enqueued. Here, the value of the Queue_n input 490 can be correlated to the address of the input queue which is to be invoked (e.g., setting the Queue_n input="1" causes the next available address for the first input queue $313_1$ to appear at the ADDR_A IN address bus 417; setting the Queue_n input="2" causes the next available address for the second input queue $313_2$ to appear at the ADDR_A IN address bus 417; . . . ; and, setting the Queue_n input="N" causes the next available address for the Nth input queue $313_N$ to appear at the ADDR_A IN address 417).

Here, again, note that the data unit being stored into memory 413 may correspond to an ingress packet (or portion thereof), control header, etc. Furthermore, referring briefly to FIGS. 1 and 4, note that the Queue_n input 490 value that is presented to the queuing flow management unit 421 may be a look up output value. That is, the Queue_n input 490 value may be the result of a look-up that was performed by network processing logic (e.g., similar to that described with respect to the network processing logic 102 and look-up resource 104 of FIG. 1) in order to classify the packet to which the data unit presented at the DATA_A input 416 corresponds to. As such, queuing input 411 of FIG. 4 can be viewed as an embodiment of queuing input 311 of FIG. 3. When the moment arises for a data unit to be extracted from an input queue (e.g., so that it can be written into an intermediate queue or an output queue), the queuing flow management unit 421 applies the appropriate address value at the ADDR_B IN address bus 419 as part of a read operation and the data unit appears at the DATA_B IN 418 data bus. If the data unit is to be written into an intermediate queue it flows along data path 451. Alternatively, if the data unit is to be written into an output queue it flows along data path 452.

Similarly, when the moment arises for a data unit to be placed into or extracted from a particular intermediate queue, the queuing flow management unit 421 applies the appropriate address value at the ADDR_INT address bus 422. If the data unit is to be written into an intermediate queue, the data unit travels from the queuing flow management unit 422 to the intermediate RAM 433 (e.g., along intermediate RAM data bus 420); and, if the data unit is to be read from an intermediate queue, the data unit travels from the intermediate RAM 433 to the queuing flow management unit 421 (e.g., also along intermediate RAM data bus 420).

Note that the particular interface to the intermediate RAM 423 observed in FIG. 4 (which comprises data bus 420, and address bus 422) is drawn as a bidirectional data bus 420. As such, data units that are written into the intermediate RAM 433 flow along the same data bus as the data units that are read from the intermediate RAM 433. It is important to point out that alternative interfaces may be implemented. For example, a pair of uni-directional data buses may be used (e.g., a first data bus for writing data units into the intermediate RAM 433; and, a second data bus for reading data units from the intermediate RAM 433). A pair of unidirectional data buses may be implemented, for example, with a dual ported intermediate RAM 423. Those of ordinary skill will be able to properly tailor one or more data buses and one or more address buses for whatever intermediate RAM interface they wish to implement (e.g., DDR DRAM, SDRAM, RDRAM, SRAM, etc.).

Continuing then, when the moment arises for a data unit to be placed into an output queue, the queuing flow management unit 421 applies the appropriate address value at the ADDR_A OUT address bus 425 and writes the data unit into the output RAM 424 along the DATA_A OUT data bus 424. Finally, when the moment arises for a data unit to be extracted from an output queue, the queuing flow management unit 421 applies the appropriate address value at the ADDR_B OUT address bus 426 so that the appropriate data unit can be read from the output RAM 424 along the DATA_B OUT data bus 312. Note that the DATA_B OUT data bus can be viewed as being an embodiment of the queuing output 312 of FIG. 3.

C. Network Processor Semiconductor Chip Implementation

Figure 5:
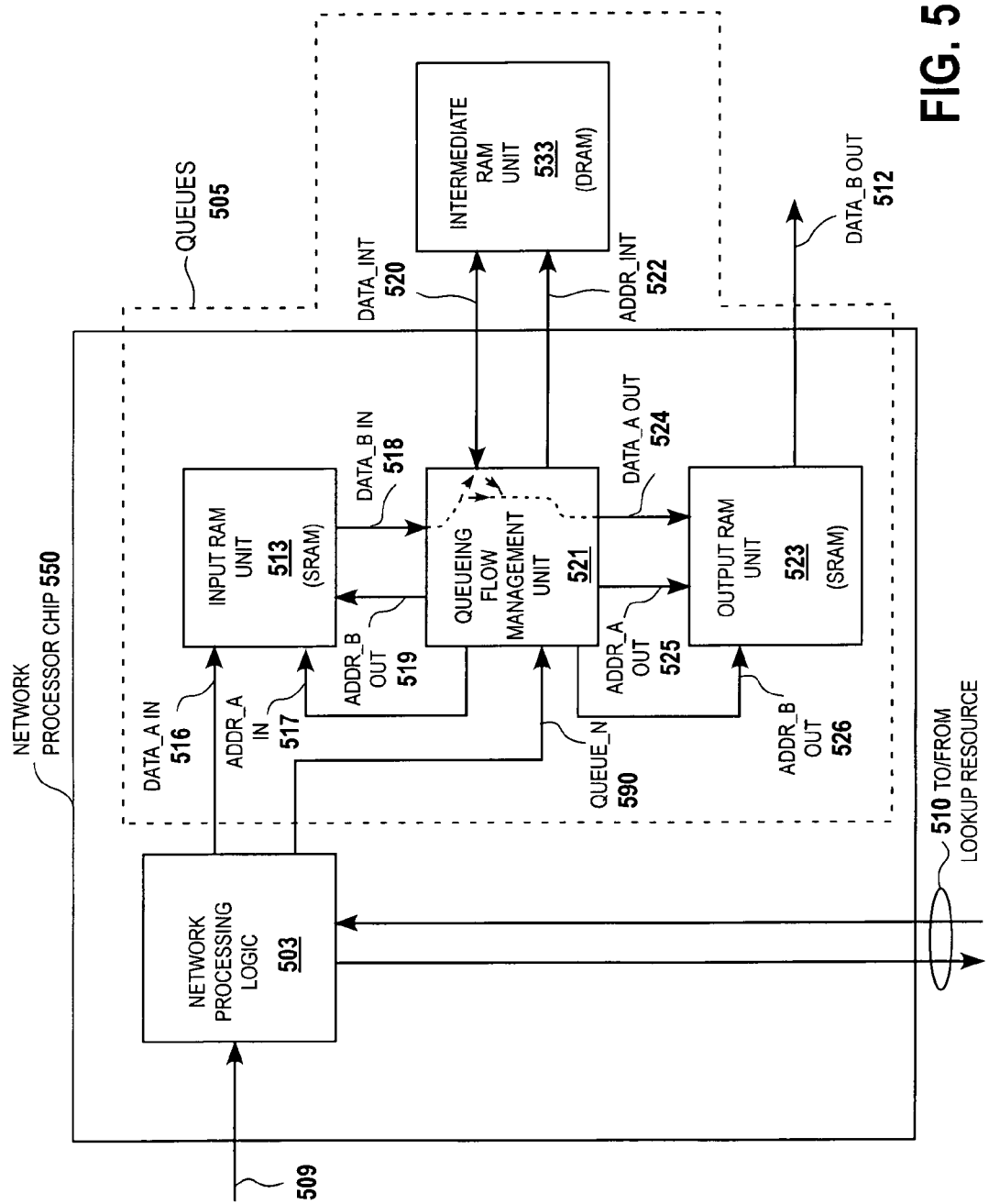
FIG. 5 shows an embodiment of the memory management architecture of FIG. 4 implemented in part with a network processor chip.

FIG. 5 shows an embodiment of the memory management architecture of FIG. 4 implemented in part with a network processor chip 550. Network processing chips have received widespread attention recently because they integrate onto a single semiconductor chip circuitry that helps perform basic networking tasks. For example, the exemplary network processing chip architecture of FIG. 5 includes on the same semiconductor chip 550: 1) the network processing logic 503 that helps perform a look-up based upon an ingress packet header; and, 2) the input RAM unit 513, output RAM unit 523 and queuing flow management unit 521 that helps to implement the queuing architecture described above with respect to FIG. 4. As such, both the look-up networking task and the queuing networking task are substantially implemented with a single semiconductor chip 550.

Consistent with standard semiconductor manufacturing techniques, the embodiment of FIG. 5 indicates that the "on chip" input and output RAM units 513, 523 are implemented with Static RAM (SRAM) cells and the "off chip" intermediate RAM unit 533 is implemented with Dynamic RAM (DRAM) cells. SRAM cells emphasize the use transistors; and, as such, are easily integrated along with logic circuitry (such as network processing logic 503 and queuing flow management unit 521) onto the same semiconductor chip 550. DRAM cells, however, emphasize the use of capacitors and are currently less easily integrated onto the same semiconductor chip 550 with logic circuitry and SRAM cells.

As such, in the embodiment of FIG. 5, the intermediate queues (being implemented with a DRAM memory unit 533) are located on one or more separate semiconductor chips than the semiconductor chip 550 on which the networking processing logic 503, input and output RAMs 513, 523, and queuing flow management unit 521 are integrated. In alternate embodiments, due to recent semiconductor manufacturing technology advances (e.g., "embedded DRAM"), DRAM cells may be integrated onto the same semiconductor chip with SRAM cells and/or standard logic circuitry. As such, the teachings herein should not be automatically construed as being limited to embodiments where a DRAM memory and an SRAM memory are implemented on separate semiconductor chips. Furthermore, it is important to recognize that with respect to the broader perspective of FIG. 4, any type of RAM may be used for any of the RAMs 413, 423, 433 observed therein.

Various types of DRAM memory units exist such as, to name just a few, Double Data Rate (DDR) DRAM, Rambus DRAM (RDRAM) which corresponds to a memory interface developed by Rambus Corporation, Synchronous DRAM (SDRAM), etc. Any of these (as well others that are in existence or may come into existence) may be used to implement the DRAM memory unit 533 of FIG. 5. Note also that in the particular embodiment of FIGS. 4 and 5, the input and output RAM units 413, 423, 433, 513, 523, 533 are dual ported (as represented with each having a pair of address buses (417, 517 and 419, 519 for input RAM unit 413, 513; and, 425, 525 and 426, 526 for output RAM 423, 523 and a pair of data buses (416, 516, and 418, 518 for input RAM unit 413, 513 and, 424, 524 and 426, 526 for output RAM unit 423, 523). It is important to note the particular choice of how many ports per RAM unit is to be utilized is up to the individual designer.

D. Queuing Flow Management Unit & Trio of Methodologies

Figure 6A:
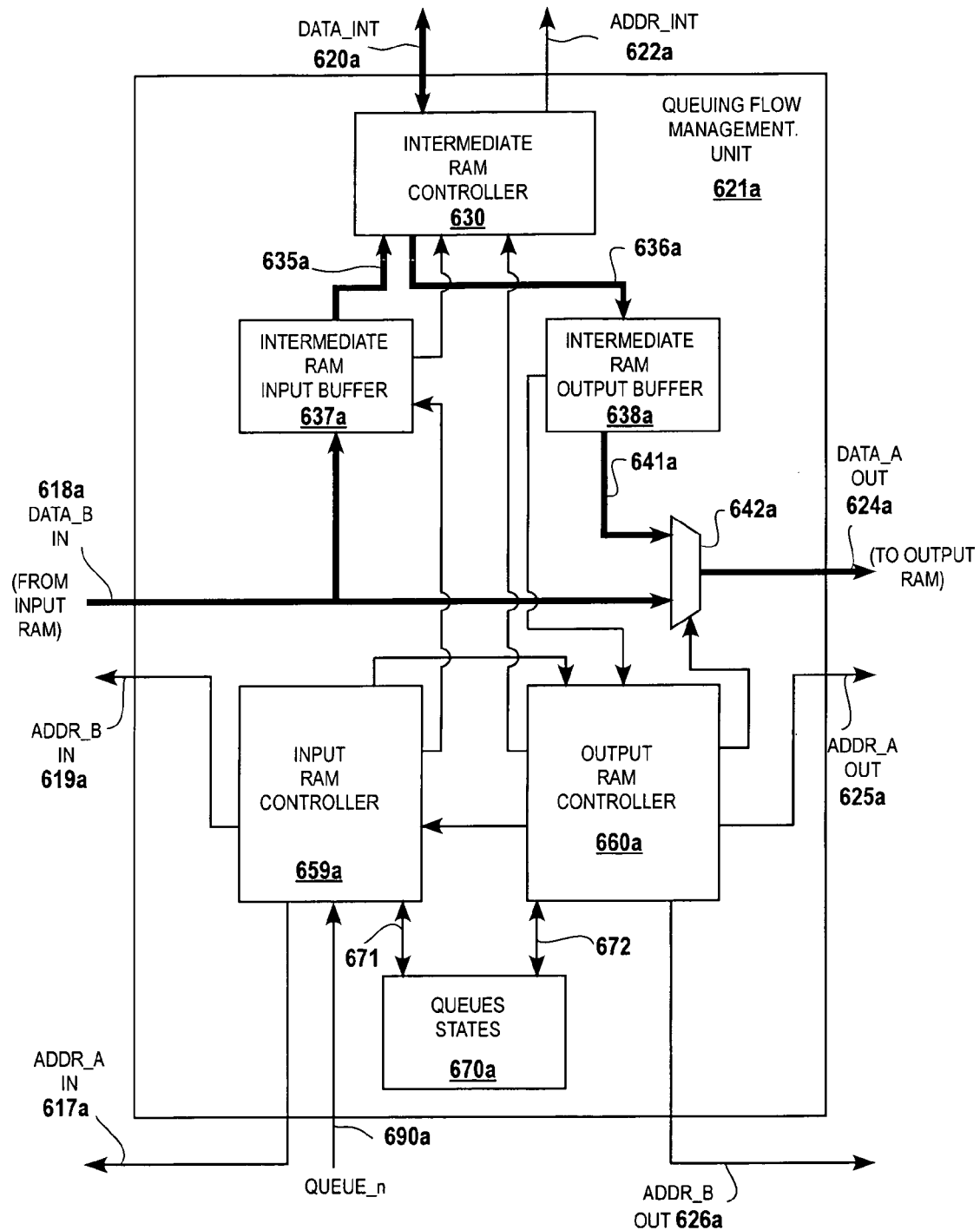
FIG. 6a shows a first design embodiment for the Queuing Flow Management unit of FIGS. 4 and 5.
Figure 7:
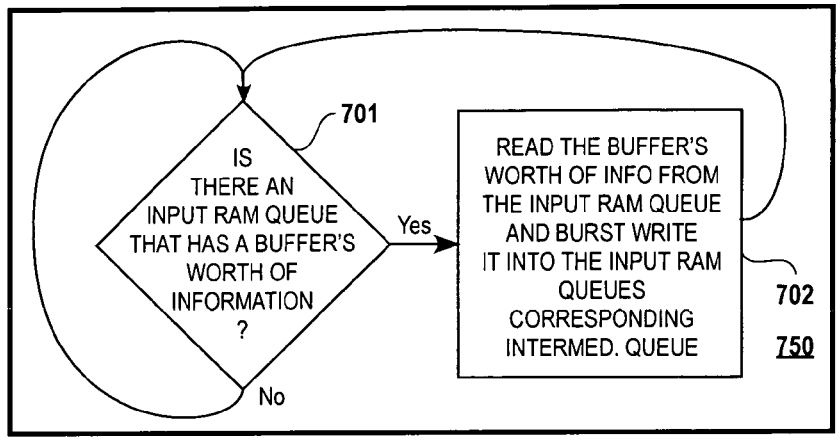
FIG. 7 shows an embodiment of a methodology that can be performed by the design approaches of FIGS. 4 and 5.
Figure 7:
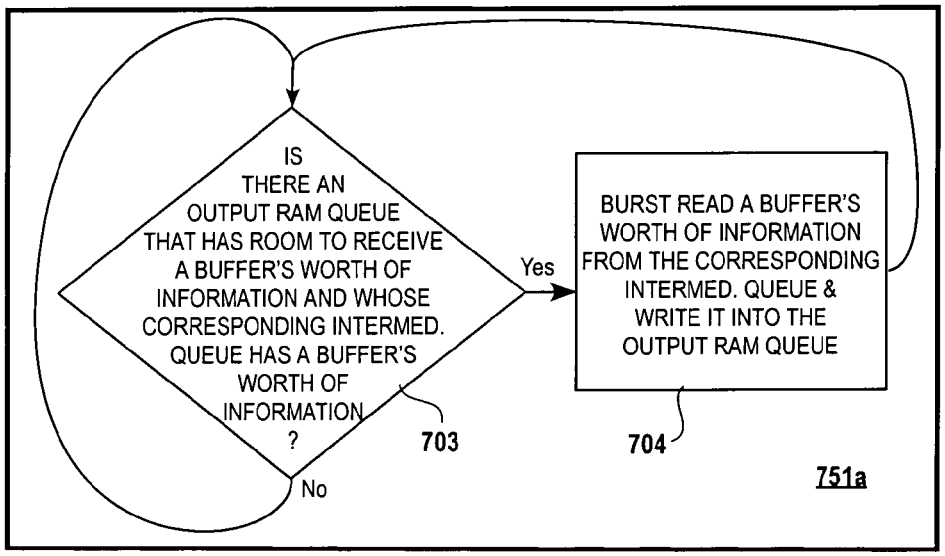
Figure 7:
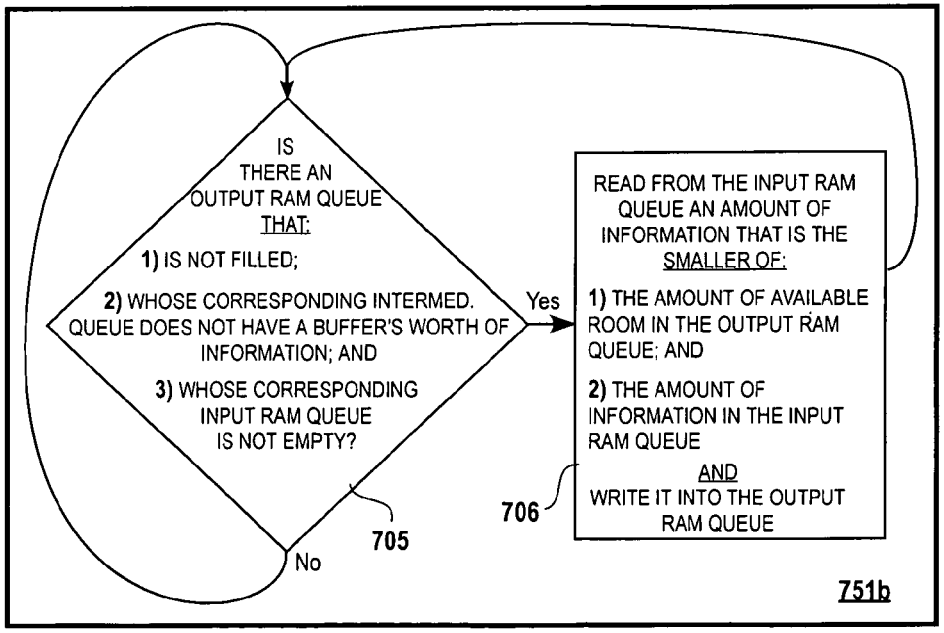

FIG. 6a shows a design embodiment 621a for the queuing flow management unit 421, 521 of FIGS. 4 and 5; and, FIG. 7 shows embodiments for a trio of methodologies 750, 751a and 751b that can be performed by the queuing flow management unit 421, 521, 621a of FIGS. 4, 5, and 6a. Before continuing, however, it is important to emphasize the approach of FIG. 6a is just one example of many possible approaches that could be used to implement the broader approach discussed above with respect to FIGS. 3 and 4. As such, the claims that follow should not be construed as being automatically limited to the specific details observed in FIG. 6a and the figures that follow.

Referring to FIGS. 4, 5, and 6a, note that the Queue # input 690a, ADDR_A IN address bus 617a, ADDR_B IN address bus 619a, DATA_B IN data bus 618a, DATA_INT bus 620a, ADDR_INT bus 622a, DATA_A OUT bus 624a, ADDR_A OUT bus 625a, ADDR_B OUT 626a and DATA_B OUT bus 612a of FIG. 6 may each be correspondingly viewed as embodiments of the Queue # inputs 490, 590, ADDR_A IN address buses 417, 517 ADDR_B IN address buses 419, 519 DATA_B IN data buses 418, 518 DATA_INT buses 420, 520 ADDR_INT buses 422, 522 DATA_A OUT buses 424, 524 ADDR_A OUT buses 425, 525 ADDR_B OUT 426, 526 and DATA_B OUT buses 412, 512 of FIGS. 4 and 5.

The queuing flow management unit 621a of FIG. 6a and the trio of methodologies of FIG. 7, together, can be used to implement a queuing approach that has a large degree of overlap with the queuing technique that was originally discussed with respect to FIG. 3. Referring briefly to FIGS. 4 and 6a, note that data path 452 of FIG. 4 is implemented with the DATA_B IN data bus 618a, multiplexer 642a and the DATA_A OUT data bus 624a. That is, in order to transfer a data unit from an input queue to an output queue (without traveling through an intermediate queue), the data unit will travel: 1) along the DATA_B IN bus 618a (e.g., as part of an output read from the input RAM); 2) through multiplexer 642a; and, 3) along the DATA_A OUT bus 624a (e.g., as part of an input write to the output RAM).

Similarly, data path 451 of FIG. 4 is implemented with the DATA_B IN data bus 618a, an intermediate RAM input buffer 637a, the intermediate RAM input buffer output bus 635a, an intermediate RAM controller 630, and the DATA_INT data bus 620a. That is, in order to transfer a data unit from an input queue to an intermediate queue, the data unit will travel: 1) along the DATA_B IN bus 618a (e.g., as part of an output read from the input RAM); 2) through the intermediate RAM buffer 637a; 3) along the intermediate RAM input buffer output bus 635a; 4) through the intermediate RAM controller 630; and, 5) along the DATA_INT bus 624a (e.g., as part of an input write to the intermediate RAM).

Also, data path 453 of FIG. 4 is implemented with the DATA_A INT data bus 620a, the intermediate RAM controller 630, the intermediate RAM output buffer 638a, the input and output buses 636a and 641a of the intermediate RAM output buffer 638a; and, the DATA_A OUT data bus 624a. That is, in order to transfer a data unit from an intermediate queue to an output queue, the data unit will travel: 1) along the DATA_A INT data bus 620a (e.g., as part of an output read from the intermediate RAM); 2) along the input and bus 636a of the intermediate RAM output buffer 638a; 3) through the intermediate RAM output buffer 638a; 4) along the intermediate RAM output buffer output bus 641a; and, 5) through multiplexer 642a; and 6) along the DATA_A OUT data bus 624a (e.g., as part of a write into the output RAM).

The queuing flow management unit 621a of FIG. 6a can be viewed as having three basic methodologies 701, 751a, 751b which have been illustrated in FIG. 7. A first methodology 701 involves the orchestration of transferring data units from their particular input queue (within the input RAM unit) to their corresponding intermediate queue. According to the first basic methodology 701, the input RAM controller 659a "keeps abreast of" the population (or "state") of each input queue that resides within the input RAM unit (e.g., by referring to the queue states unit 670a which "keeps track of" the population of the input/output and intermediate queues being managed by the queuing flow management unit 621). Once the input RAM controller 657a recognizes 701 that an input queue state has reached a threshold level (such as a buffer's worth of information as described in more detail below), the input RAM controller 657a and intermediate RAM controller 630a orchestrate the reading of information from the input queue and its subsequent writing into a corresponding intermediate queue 702.

Note that the particular methodology 750 of FIG. 7 indicates that the threshold level of an input queue that triggers the sending of information to its corresponding intermediate queue is a "buffer's worth of information". Here, a buffer's worth of information corresponds to the amount of data that can be written into the intermediate RAM unit with a "burst" write operation. That is, recall from the discussion in the background concerning FIG. 2c that a memory unit can be utilized more efficiently if its read and write operations are handled through burst operations (where only a single address or other reference need be supplied by a larger system in order to perform multiple read operations or multiple operations).

Figure 2A:
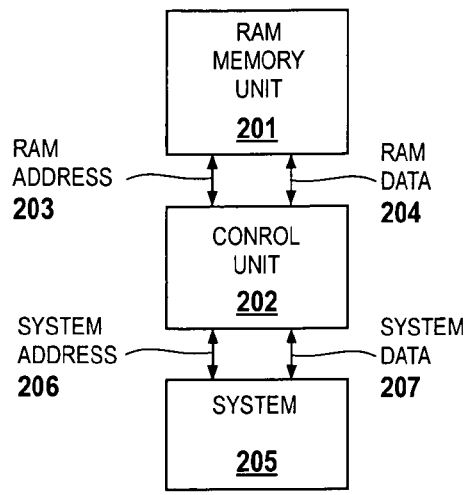
FIG. 2a shows an embodiment of a control unit coupled to a system and a RAM memory unit.
Figure 2B:
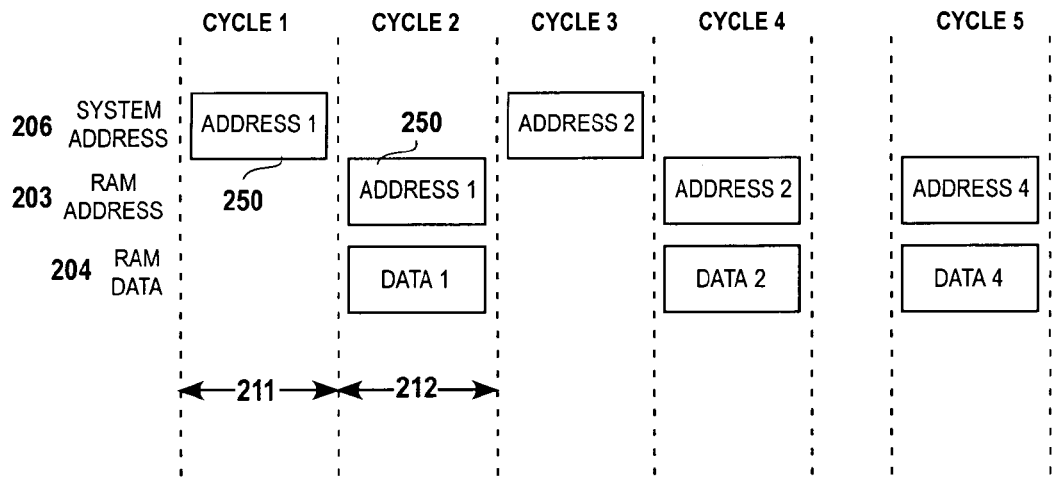
FIG. 2b shows an embodiment of a traditional approach for accessing a RAM memory unit.
Figure 2C:
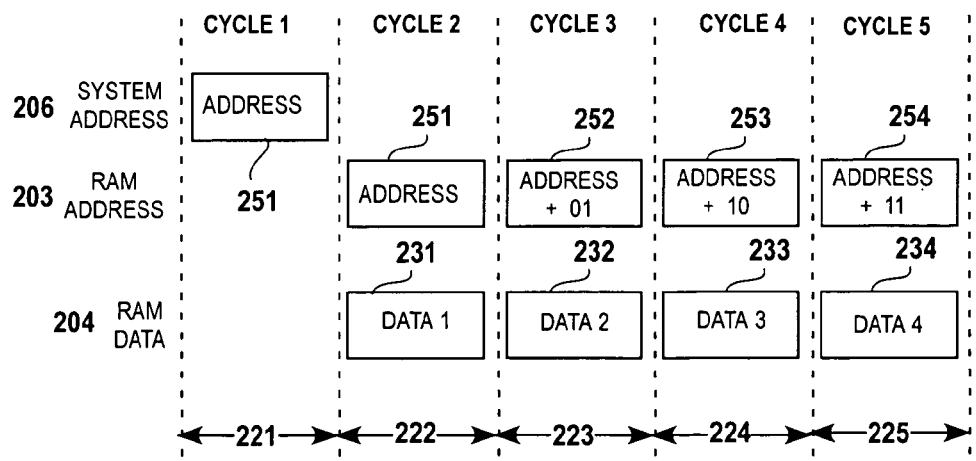
FIG. 2c shows an embodiment of a "burst" approach for accessing a RAM memory unit.

With respect to the exemplary depiction of FIG. 2c, a buffer's worth of information would therefore correspond to the combined total amount of information that is represented by data units Data_1 231, Data_2 232, Data_3 233, and Data_4 234; and, wherein, the burst operation being observed in FIG. 2c is occurring at the intermediate RAM. According to this perspective, therefore, once a buffer's worth of information has been recognized in an input queue, the queuing flow management unit 621a makes efforts to transfer the buffer's worth of information from the input queue to its corresponding intermediate queue.

Here, the intermediate RAM controller 630a "burst writes" the buffer worth's of information into the intermediate RAM after it has been received from the intermediate RAM input buffer 637a. Note that (as described above) in being transferred from an input queue to an intermediate queue, a buffer's worth of information will: 1) appear at the DATA_B IN bus 618a (as a result of a read from the input RAM unit); 2) be registered in the intermediate RAM input buffer 637a; 3) be transferred from the intermediate RAM input buffer 637a to the intermediate RAM controller 630a; and then, 4) be transferred (via a "burst" write) from the intermediate RAM controller 630a to the intermediate RAM over the DATA_INT data bus 620a.

The second methodology 751a involves the orchestration of transferring data units from their particular intermediate queue (within the intermediate RAM unit) to their corresponding output queue. According to the second basic methodology 751a, the output RAM controller 660a "keeps abreast of" the population (or "state") of each output queue that resides within the output RAM unit (e.g., by referring to the queue states unit 670a). Here, the input RAM controller 657a is designed to recognize 703 when: 1) an output queue has enough available space to receive a buffer's worth of information; and, 2) the output queue's corresponding intermediate queue has a buffer's worth of information.

Upon such recognition 703, the output RAM controller 660a and intermediate RAM controller 630a will orchestrate a "burst" read from the intermediate RAM and a write operation into the output RAM so that a buffer's worth of information is transferred 704 from the intermediate queue to its output queue 704. Note that (as described above) in being transferred from an intermediate queue to an output queue, a buffer's worth of information will: 1) appear at the DATA_INT bus 620a (e.g., as a result of a "burst" read from the intermediate RAM unit); 2) be registered in the intermediate RAM output buffer 638a; 3) be transferred from the intermediate RAM output buffer 638a through multiplexer 642a and written into the output RAM via the DATA_A OUT bus 624a.

In light of these pair of methodologies 750, 751a, note that the queue flow management unit 621a executes "burst" operations in both directions. That is, when information is to be written into the intermediate queue a "burst" write operation is employed; and, when information is to be read from the intermediate queue a "bust" read operation is employed. As a result, the intermediate RAM is used efficiently resulting in enhanced throughput through the queues that are being managed. Note that the exact number of write or read operations per burst can vary from embodiment to embodiment.

The third methodology 751b of FIG. 7 involves the orchestration of transferring data units from their particular input queue (within the input RAM unit) to their corresponding output queue. According to the third basic methodology 751b, again, the output RAM controller 660a "keeps abreast of" the population (or "state") of each output queue that resides within the output RAM unit. Here, the input RAM controller 657a is designed to recognize 705 when: 1) an output queue has enough available space to receive any information (e.g., is not filled); 2) the output queue's corresponding intermediate queue does not have a buffer's worth of information; and 3) the output queue's corresponding input queue has any information (e.g., is not empty).

Upon such recognition 705, the output RAM controller 660a and input RAM controller 659a will orchestrate a transfer 706 of an amount of information from the input queue to the output queue that is no more than the lesser of: 1) the amount of available space within the output queue; and, 2) the amount of information within the input queue. Note that (as described above) in being transferred from an input queue to an output queue, the appropriate amount of information will: 1) appear at the DATA_B IN bus 618a (e.g., as a result of a read from the input RAM unit); and 2) flow through multiplexer 642a so that it can be written into the output RAM via the DATA_A OUT bus 624a.

Keeping Track of Queue States

As the input RAM and output RAM controllers 659a, 660a are charged with keeping abreast of the states of the queues they manage, the queue states unit 670a is responsible for keeping track of changes to these states. An exemplary depiction of the queues states unit 670c is observed in FIG. 6c. According to the embodiment of FIG. 6c, the queue states unit 670a may have register space (or memory space) 695 reserved for each input queue that indicates of much data is presently being enqueued within the input. From this, for example, it can be determined whether or not a particular input queue has a buffer's worth of information. This register or memory space 695 can be maintained by keeping track of how much data is written into an input queue (e.g., by observing the quantity of each data write into each input queue) and keeping track of how much data is read from an output queue. Referring to FIGS. 6a and 6c, in an embodiment, the queue_n input 690 (or a second input) is used to indicate the size of the amount of data to be written into an input queue (so that the input queue state can be incremented accordingly). As the input RAM controller 659a is aware of both of these activities, they can be reported (e.g., via interface 671) to the queue states unit 670a so that the correct state of each queue is maintained for later reference.

Similarly, the queue states unit 670a may have register space (or memory space) 696 reserved for each intermediate queue that indicates whether or not a particular intermediate queue has a buffer's worth of information. For a design approach that only writes and reads information to/from the intermediate queues in "burst" writes and "burst" reads, this determination boils down to whether or not the intermediate queue is empty or not; which, in turn, can be determined by subtracting the number of times an intermediate queue has been read accessed from the number of times an intermediate queue has been write accessed.

Better said, anytime an intermediate queue has been burst write accessed more than burst read accessed, the intermediate queue will be non-empty and will have at least a buffer's worth of information. As the input RAM controller 659*a* is aware of the write accesses to the intermediate RAM and the output RAM controller 660*a* is aware of the read accesses from the intermediate RAM, these events can be reported (e.g., via interface 671 and 672) to the queue states unit 670*a* so that whether or not an intermediate queue is empty can be maintained for later reference.

Also, similarly, the queue states unit 670*a* may have register space (or memory space) 697 reserved for each output queue that indicates how much available space exists for the output queue. From this tabulation, it can be determined if a particular output queue has room for a buffer's worth of information and whether or not a particular output queue is not-full. Here, the former situation can trigger a burst read from the intermediate RAM and the later situation can trigger a transfer from the input RAM. As the output RAM controller 660*a* is aware of the reading and writing activities from/to each output queue, these events may be reported to the queue states unit 670*a* (e.g., via interface unit 672) so that these pair of statistics can be properly maintained.

Arbitration

Referring back to FIG. 6*a* note that three points in the queuing flow management unit design 621*a* have multiple uses. That is, firstly, the input RAM DATA_B 618*a* bus is used to not only transfer data units from the input RAM to the output RAM but also to transfer data units from the input RAM to the intermediate RAM. Secondly, the output RAM DATA_A data bus 624*a* is not only used to transfer data units from the input RAM to the output RAM but also to transfer data units from the intermediate RAM to the output RAM. Thirdly, the intermediate RAM data bus 620*a* is used not only to store data units into the intermediate RAM but also to read data units from the intermediate RAM.

Because of the dual usage of these data buses 618*a*, 620*a*, 624*a*, conflicting needs for them may arise (e.g., a first output queue desires a data unit transfer from its corresponding input queue at the same time another input queue desires a data unit transfer to its corresponding intermediate queue). Conflicting needs, to the extent that they arise, should be resolved in an organized fashion so that the operating efficiency of the queuing flow management unit 621 is preserved. Better said, as alluded to above, the various RAM controllers 630*a*, 659*a*, 660*a* should be orchestrated so as to constructively resolve the contentions that arise for the use of these data buses 618*a*, 620*a*, 624*a*.

Figure 6B:
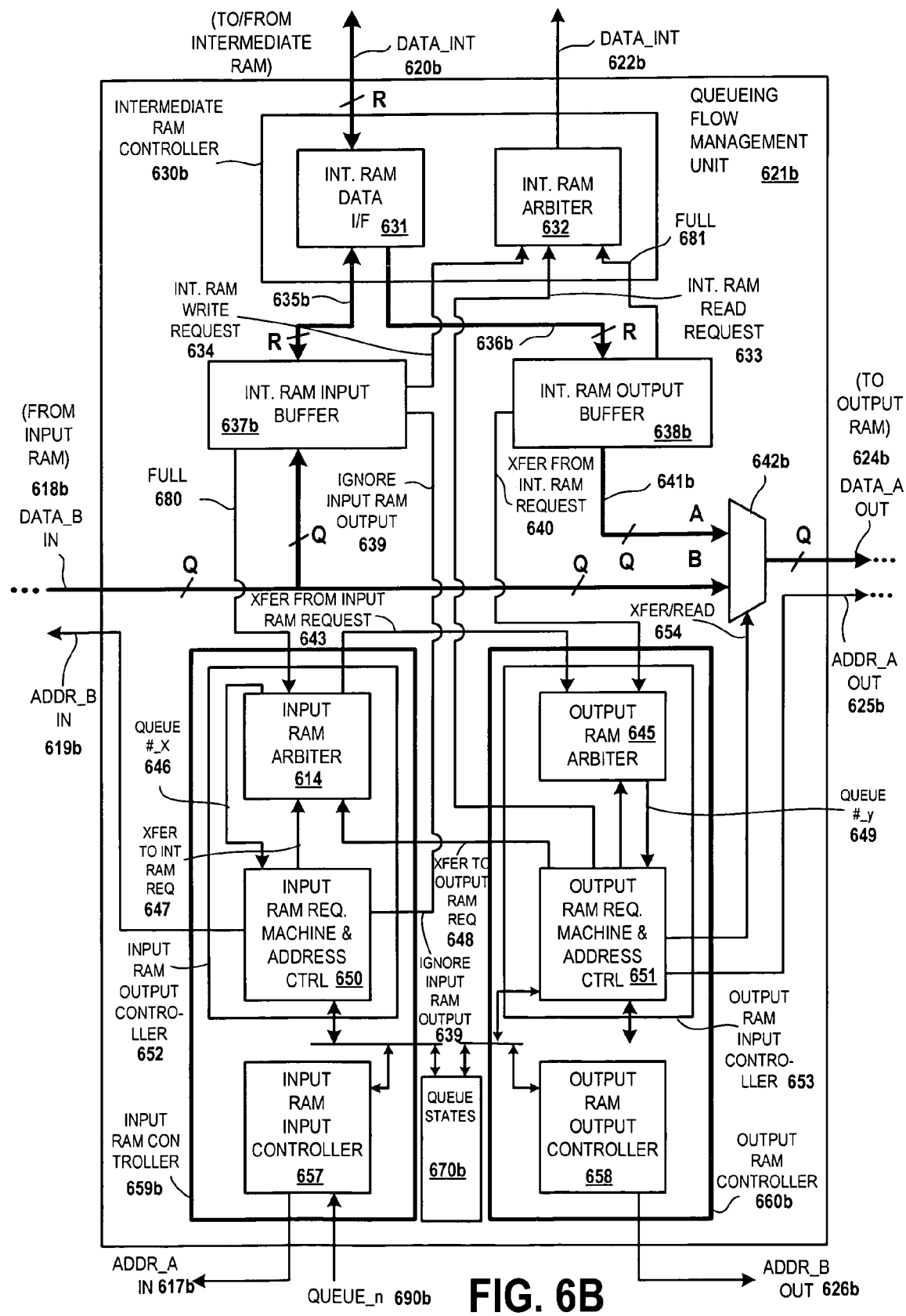
FIG. 6b shows a second design embodiment for the Queuing Flow Management unit of FIGS. 4 and 5.

FIG. 6*b* shows an embodiment of a queuing flow management unit 621*b* that demonstrates, in a more detailed fashion, how the RAM controllers 630*b*, 659*b*, 660*b* could be designed to implement the appropriate orchestration. More specifically, note that each RAM controller 630*b*, 659*b*, 660*b* further comprises an arbiter 632, 644, 645 that controls the data bus usage of its respective RAM. Each arbiter 632, 644, 645, as described in the paragraphs that follow, receives a pair of requests or indications that effectively serve as notice that a need has arisen for the data bus which the arbiter controls.

With respect to the intermediate RAM arbiter 632, note that arbiter 632 receives: 1) an intermediate RAM write request 634 from the intermediate RAM input buffer 637*b*; and, 2) an intermediate RAM read request 633 from the output RAM controller 660*b*. Here, the former request 634 is used to signify that a buffer's worth of data has been transferred from the input RAM and stored into the intermediate RAM input buffer 637*b*; which, in turn, corresponds to part of the machinations used to transfer the buffer's worth of data from an input queue to its corresponding intermediate queue. The later request 633 is used to signify that an output queue has room for a buffer's worth of information; and, therefore, desires to receive a buffer's worth of information from its corresponding intermediate queue.

With respect to the input RAM arbiter 644, note that arbiter 644 receives: 1) a transfer ("XFER") to intermediate RAM request 647 from the input RAM request machine unit 650; and, 2) a transfer to output RAM request 648 from the output RAM controller 660*b*. Here, the former request 647 is used to signify that an input queue state has reached a buffer's worth of data; which, in turn, will eventually cause the transfer of a buffer's worth of data from the input queue to its corresponding intermediate queue. The later request 648 is used to signify that an output queue, whose corresponding input queue is empty, in not full; which, in turn, will eventually cause the transfer of data from the input queue to its corresponding output queue.

With respect to the output RAM input arbiter 645, note that arbiter 645 receives: 1) a transfer from input RAM request 643 from the input RAM controller 652; and, 2) a transfer from intermediate RAM request 640 from the intermediate RAM output buffer 638*b*. Here, the former request 643 is used to signify that a read operation from the input RAM has been (is being, or; shortly will be) performed so that the resultant read data can be written into the output RAM as part of a transfer of data from an input queue to an output queue. The later request 640 is used to signify that a burst read from the intermediate RAM has been stored in the intermediate RAM output buffer 638*b*; which, in turn, will eventually cause the writing of a buffer's worth of data from the intermediate RAM output buffer 638*b* to the output RAM.

Each arbiter 632, 644, 645 effectively "grants" each request, at an appropriate time, by providing at its respective output 622*b*, 646, 649 an indication of the queue that is effected by the request. This indication may take the form, for example, of a specific RAM address where the effected queue's data is held; or, alternatively, a value that can be converted into a specific RAM address where the effected queue's data is held. The output 622*b* of the intermediate RAM arbiter 632 represents an embodiment of the former (because the arbiter output 622*b* corresponds to the address bus for the intermediate RAM); and the outputs 646, 649 of the input and output RAM arbiters 644, 645 each represent an embodiment of the later (because each arbiter output 646, 649 indicates the affected queue in terms of a queue number (e.g., queue_n)).

According to these approaches, the input requests 634, 633, 647, 648, 643, 640 themselves may further comprise a specific RAM address where the effected queue's data is held; or, alternatively, a value that can be converted into a specific RAM address where the effected queue's data is held. For example, referring to the intermediate RAM arbiter 632, the intermediate RAM write request 634 may be further configured to identify which intermediate queue (e.g., by specification of its "n" value) the buffer's worth of data being held by the input buffer 637*b* is to be written into. Note that this information could be "attached" as part of the initial transfer of the buffer's worth of information from the nth input queue to the intermediate RAM input buffer 637*b*.

In response to the request, the intermediate RAM arbiter 632 may be designed to convert the value received at request input 634 into a series of write addresses that are used for a burst write into the "next available" queuing space for the nth queue within the intermediate RAM. The output RAM request machine and address controller 651 may be similarly configured to identify (at the intermediate RAM read request 633) which output queue (e.g., by specification of its "n" value) is capable of receiving a buffer's worth of data being held by the intermediate RAM. Again, in response, the intermediate RAM arbiter 632 may be designed to convert the value received at request input 633 into a series of read addresses that are used for a burst read from the queuing space of the nth queue of the intermediate RAM where the buffer's worth of information is being held.

Likewise, with respect to the operation of the input RAM arbiter 644, the transfer to intermediate RAM request 647 may further comprise an indication as to which input queue (e.g., by specification of its "n" value) now stores at least a buffer's worth of information. In response, at the appropriate time so as to avoid resource conflicts for the DATA_B IN data bus 618*b*, the arbiter 644 can return this value to the input RAM request machine and address controller 650 via the Queue #_X arbiter output 646. According to this embodiment, note that the arbiter output 646 corresponds to a value from which an address can be derived rather than an actual address itself. When the input RAM request machine and address controller 650 receives this value, it establishes (at the ADDR_B IN address bus 619*b*) the address for the first buffer's worth of information within the nth input queue (so that a buffer's worth of information can be transferred from the input RAM to the intermediate RAM input buffer 637*b*).

Similarly, the transfer to output RAM request 648 may further comprise an indication as to which non-empty output queue (e.g., by specification of its "n" value) has an empty corresponding intermediate queue and a non-empty corresponding input queue. In response, at the appropriate time so as to avoid resource conflicts for the DATA_B IN data bus 618*b* and the DATA_A OUT data bus 624*b*, the input RAM arbiter 644 can forward this value to: 1) the output RAM arbiter 645 via the transfer from input RAM request 643; and 2) the input RAM request machine and address controller 650 at the Queue #_X arbiter output 646. Here, again, when the input RAM request machine and address controller 650 receives this value, it establishes (at the ADDR_B IN address bus 619*b*) the address for the amount of data within the nth input queue that is to be transferred from the nth input queue to the nth output queue. Simultaneously, the input RAM request machine and address controller 650 activates the ignore input RAM output 639 signal line so that the data being read from the input RAM is not written into the intermediate RAM input buffer 637*b*.

In response to the value also being received at the output RAM arbiter 645, at the appropriate time so as to avoid resource conflicts for the DATA_A OUT data bus 624*b*, the output RAM arbiter 645 can return this value to the output RAM request machine and address controller 651. When the output RAM request machine and address controller 651 receives this value, it establishes (at the ADDR_A OUT address bus 625*b*) the address for the space within the nth output queue where the data that was (or, is; or, is to be) transferred from the nth input queue is to be stored. Simultaneously, the output RAM request machine and address controller 651 sets the XFER/Read multiplexer input 654 so that the data appearing on data bus 618*b* also appears at data bus 624*b*.

Lastly, the transfer from intermediate RAM request 640 may further comprise an indication as to which intermediate queue (e.g., by specification of its "n" value) has just experienced a burst read of a buffer's worth of information which was stored into the intermediate RAM output buffer 638*b*. Note that this information could be "attached" as part of the transfer of the buffer's worth of information from the nth intermediate queue to the intermediate RAM output buffer 638*b*.

In response to the sending of this value along the transfer from intermediate RAM request line 640, at the appropriate time so as to avoid resource conflicts for the DATA_A OUT data bus 624*b*, the output RAM arbiter 645 will forward the value to the output RAM request machine and address controller 651. When the output RAM request machine and address controller 651 receives this value, it establishes (at the ADDR_A OUT address bus 625*b*) the address for the space within the nth output queue where the buffer's worth of data within the intermediate RAM output buffer 638*b* is to be stored. Simultaneously, the output RAM request machine and address controller 651 sets the XFER/Read multiplexer input 654 so that the data appearing on data bus 641*b* also appears at data bus 624*b*.

Queuing Flow Management Operation

Figure 8:
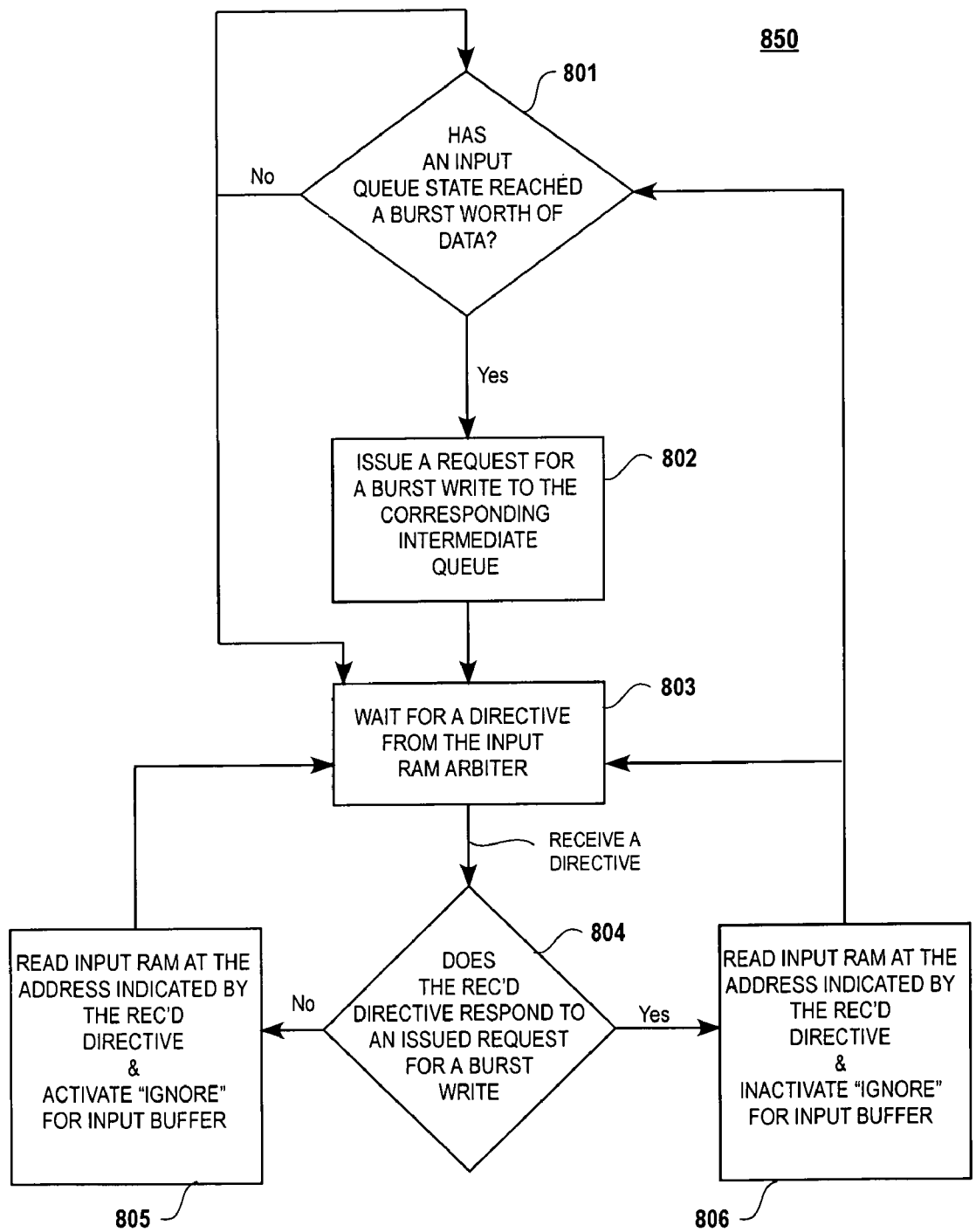
FIG. 8 shows a methodology that may be performed by the INPUT SRAM Request Machine and Address Control Unit of FIG. 7.
Figure 9:
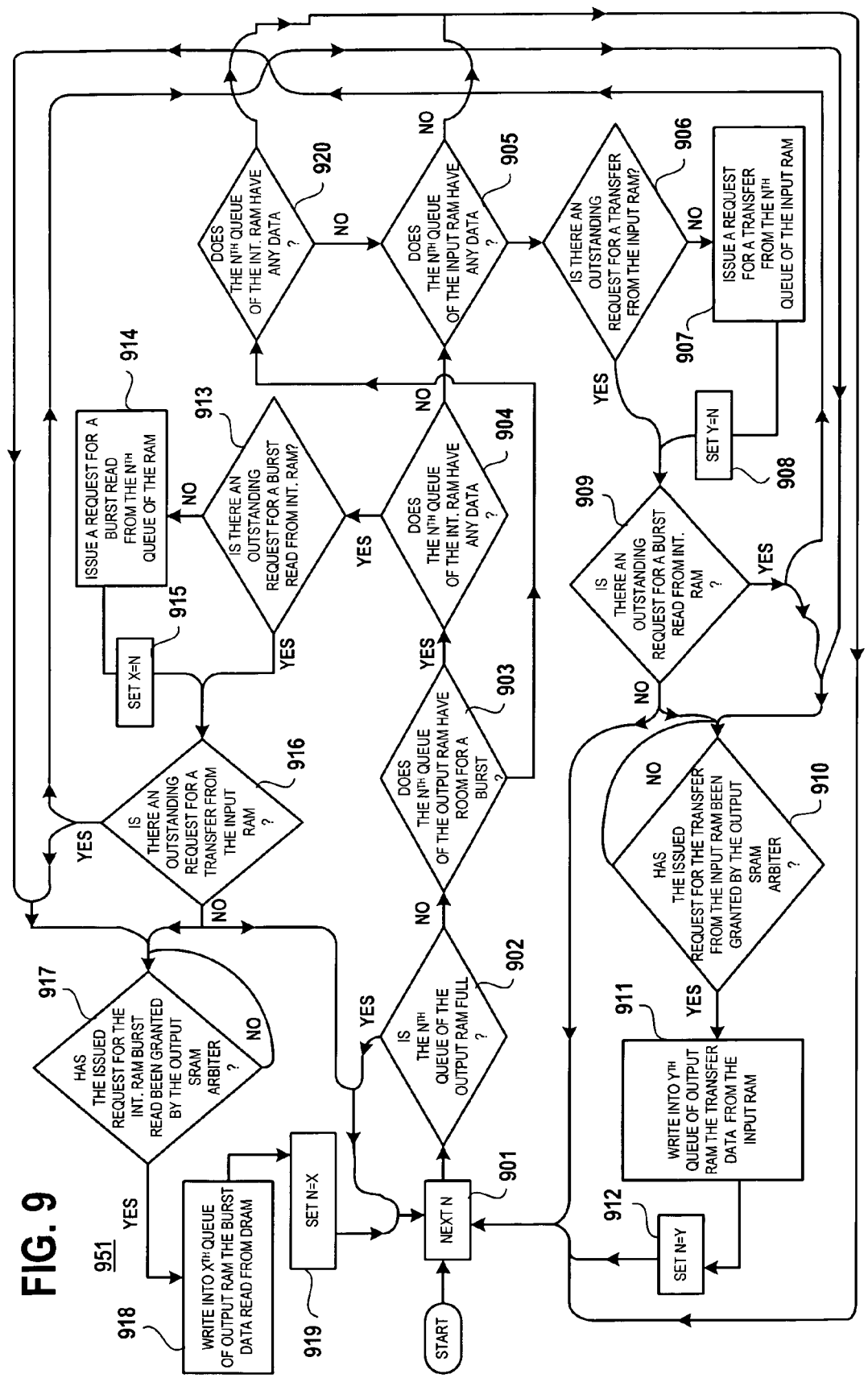
FIG. 9 shows a methodology that may be performed by the OUTPUT SRAM Request Machine and Address Control Unit of FIG. 7.

As alluded to above, the arbiters 632*b*, 644*b*, 645*b* of FIG. 6*b* are designed to regulate the usage of a resource that may be the object of multiple, simultaneous needs. FIGS. 8, 9 and 10 serve to illustrate an embodiment of how the arbiters 632*b*, 644*b*, 645*b* and request machine units 650, 651 control the overall operation of the queuing flow management unit 621*b*; and, in so doing cooperatively manage the implementation of N input, intermediate and output queues.

FIG. 8 shows an embodiment 850 of a methodology that the input RAM request machine and address controller 650 of FIG. 6*b* may be designed to operate according to. Referring to FIGS. 6*b* and 8, the request machine aspect of the controller 650 continually scans the queues states 670*b* (e.g., by continually referring to table 695 of FIG. 6*c*) so as to recognize 801 when a input queue state has reached a buffer's worth of data. Upon such recognition, a request is issued 802 (e.g., along the transfer to intermediate RAM request line 647) to the input RAM arbiter 644 for a transfer of a buffer's worth of information from the input queue having the buffer's worth of data to its corresponding intermediate queue.

After the request has been issued 802, the request machine and input RAM address 650 enters a "wait state" until a directive is received from the input RAM arbiter 644 (e.g., along the queue#_X input 646. Note that, consistent with the embodiments described in the preceding section, the directive from the arbiter may describe the particular input queue that is to be next read by the address control portion of the request machine and address controller unit 650. If the input queue that is indicated in the received directive from the input RAM arbiter 644 "matches" the input queue having the buffer's worth of data (for whom the request for a transfer to the intermediate RAM was issued 802), the input RAM request machine and address controller 650 will recognize 804 that the issued request has been favorable responded to.

In response, the address control portion of the request machine and address controller 650 will initiate a read of the input RAM at the address(es) where the buffer's worth of information is held; and, deactivate 806 the "ignore input RAM output" signal 639 in order to enable the reception of the buffer's worth of data that is being read from the input queue at the intermediate RAM buffer 637*b*. At a later time, as discussed, the intermediate RAM input buffer 637*b* will request the intermediate RAM arbiter 632 for a burst write into the intermediate RAM in order to complete the transfer originally requested by the request machine 650.

If, however, the input queue that is indicated in the received directive from the input RAM arbiter 644 does not "match" the input queue having the buffer's worth of data (for whom the request for a transfer to the intermediate RAM was issued 802), the input RAM request machine and address controller 650 will recognize 804 that the issued request has not been favorable responded to. Rather, the input RAM request machine 650 will recognize that a request issued by the output RAM request machine and address controller 651 (for a transfer from input RAM to output RAM) has been favorably responded to by the input RAM arbiter 644 instead.

In response, therefore, the address control portion of the input RAM request machine and address controller 650 will initiate a read of the input RAM at the address(es) where the data to be transferred to the output RAM is held; and, activate 805 the "ignore input RAM output" signal 639 so that the data being read from the input queue is not registered by the intermediate RAM buffer 637*b*. Note that, according to the embodiment of FIG. 8, a request for a transfer to the intermediate RAM is not issued 802 by the input RAM request machine 650 if an outstanding request for such a transfer already exists. That is, the input RAM request machine 650 issues requests for transfers to intermediate RAM "one at a time" so that the input RAM arbiter 644 does not become "swamped" with requests for transfers to intermediate RAM.

FIG. 9 shows an embodiment 951 of a methodology that the output RAM request machine and address controller 651 of FIG. 6*b* may be designed to operate according to. Referring to FIGS. 6*b* and 9, the request machine aspect of the controller 651 scans the queues states 670*b* (e.g., by referring to table 697 of FIG. 6*c*) to see if an output queue has room to entertain the entry of more data. Better said, the output RAM request machine 651 looks to see if an output queue is filled to capacity or not 902. If so, it effectively continually scans the output queues by looking to see if the "next" queue 901 is full 902. Once an output queue is recognized that is not full, however, the state of the output queue is examined 903 to see if enough room exists in the output queue to entertain a buffer's worth of information.

If there is not enough room in the output queue to receive a buffer's worth of information, an inquiry 920 is made into the state of the intermediate queue that feeds the output queue (e.g., by referring to table 696 of FIG. 696 of FIG. 6*c*) to see if it is empty or not. If the intermediate queue is not empty, the output queue cannot except any data (even though it is not full) because it must accept a buffer's worth of information from the intermediate queue in order to preserve FIFO queuing; and, as already determined, there is not enough room in the output queue to receive this much data. Hence, an analysis into another output queue is commenced 901.

If, however, the initial inquiry 903 into the actual state of the output queue reveals that the output queue can accept a buffer's worth of data; an inquiry into the state of the intermediate queue that feeds the output queue is also made 904. Here, if it is determined that the intermediate queue has a buffer's worth of information, a request is made 914 for a burst read from the intermediate RAM in order to retrieve this data (e.g., by signaling along the intermediate RAM request line 633) if the output RAM request machine 651 does not presently have any other outstanding requests for a burst read from the intermediate RAM 913.

If an outstanding request for a burst read from the intermediate RAM presently exists (e.g., for another output queue), another request for a burst read is not made (so that the intermediate RAM arbiter 632 is not swamped with multiple requests for a burst read). Note also that, if a request for a transfer of data from the input RAM to the output RAM has also been made (e.g., for another output queue), the output RAM request machine and address controller 651 simply waits 917, 910 for one of these requests to be responded to. Alternatively, if a request for a transfer of data from the input RAM to the output RAM does not also exist, the output RAM request machine and address controller 651 simply waits 917 for the outstanding request for a burst read to be favorably responded to; and, is free to further analyze other output queues 901 to see if one is in a position to accept a transfer from the input RAM.

As noted just above, if the output RAM request machine 651 does not presently have any other outstanding requests for a burst read from the intermediate RAM 913 it can issue a request 914 for a burst read from the intermediate RAM for the newly realized output queue that has both: 1) room to receive a buffer's worth of data 903; and 2) a corresponding input queue having a non empty state 904. As described just above, the request may be made 914 via the intermediate RAM read request line 633 of FIG. 6*b*.

Once the request is issued 914, the output RAM request machine 651 waits 917 for the request to be favorably responded to (e.g., via the Queue#_Y input 649 from the output RAM arbiter 645 (who, previously, received notice of the requested data's arrival into the intermediate RAM output buffer 638*b*). If a request for a transfer of data from the input RAM to the output RAM also exists 916 (e.g., for another output queue), the request machine 651 also waits for that request to be favorably responded to (e.g., via the Queue#_Y input 649 from the output RAM arbiter 645 (who, correspondingly, received notice that the input RAM is positioned to provide the request data from the input RAM via request 643 from the input RAM arbiter 644).

When a request is favorably responded to, appropriate action is undertaken by the address control portion of the output RAM request machine and address controller 651. That is, once a request 914 for a burst read from intermediate RAM is favorably responded to, the address for the output queue who is to receive the buffer's worth of information from the intermediate RAM output buffer 638*b* is established at the ADDR_A OUT address bus 625 so that it can be written 918 into the output queue. Note that, simultaneously, the control unit 651 also sets the multiplexer 642*b* channel select input 654 to pass the contents of the output 641*b* of the intermediate RAM output buffer 638*b* to the DATA_A OUT data bus 624*b*.

Likewise, once a request 907 for a transfer from input RAM is favorably responded to, the address for the output queue who is to receive the transfer from the input RAM is established at the ADDR_A OUT address bus 625 so that it can be written 911 into the output queue. Note that, simultaneously, the control unit 651 also sets the multiplexer 642*b* input 654 to pass the contents of the DATA_B IN data bus 618*b* to the DATA_A OUT data bus 624*b*. Note that, according to the particular embodiment of FIG. 9, once a request 914, 907 for the nth queue has been favorably responded to, the request machine 651 begins to inquire into the (n+1) the queue 915, 919, 908, 912.

Lastly, if it is an output queue is identified that is not full 902 and whose corresponding intermediate queue is empty 904, 920, the output RAM request machine controller checks to see if its corresponding input queue has any data 905 (e.g., by looking at table 695 of FIG. 6*c*). If not, a next output queue is analyzed 901. If so, a request for a transfer of data from the input RAM is made 906 (e.g., via an indication along the transfer to output RAM request line 648). Here, note that the request 906 can include an indication of how much data is to be transferred (e.g., the lesser of the state of the input queue and the output queue as determined from a comparison of tables 695 and 697 of FIG. 6c).

Referring to FIG. 6b, note that: 1) the DATA_B IN bus 618b, the intermediate RAM output buffer output bus 641a, and the DATA_A OUT bus 624b are each Q bits wide; and, 2) that the DATA_INT bus 620b, the intermediate RAM input buffer output bus 635b, and the intermediate RAM output buffer input bus 636b are each R bits wide. In an embodiment, Q is greater than R so that data transfers on the DATA_B IN and DATA_A OUT buses 618b, 624b are made at a faster rate than the rate at which data transfers are made on the DATA_INT bus 620b. For example, according to a further embodiment, the DATA_INT bus 620b is 128 bits wide; and the DATA_B IN and DATA_A OUT buses are each 512 bits wide. As such, for the same clock speed, data transfers can be made on the DATA_B IN and/or DATA_A OUT buses 618b, 624b (e.g., to support an input RAM to output RAM data transfer; or, an input RAM to intermediate RAM input buffer 637b data transfer; or, intermediate RAM output buffer 638b to output RAM data transfer) at four times the rate at which data transfers are made on the DATA_INT bus 620b.

Because of this difference in bandwidth, the queuing flow management unit 621b can entertain multiple transfers on the DATA_B IN and/or DATA_A OUT buses 618b, 624b for each transfer on the DATA_INT bus 620b. Better said, for example, while a single burst read or burst write is occurring on the DATA_INT bus 620b: 1) the DATA_B IN 618b bus can be used to transfer a burst of information to the intermediate RAM input buffer 637b as well as transfer information to the DATA_A OUT bus 624b; and, 2) the DATA_A OUT bus 624b can be used to transfer a buffer's worth of information from the intermediate RAM output buffer 638b as well as accept information from the DATA_B IN bus 618b FIG. 10 provides an illustration in greater detail. According to the exemplary depiction of FIG. 10, at time T1 three outstanding requests are made within the queuing flow management unit of FIG. 6b. A first request is a request for a burst read from the intermediate RAM (as made by the output RAM request machine 651 along request line 633). A second request is for a transfer of a buffer's worth of information from the input RAM to the intermediate RAM input buffer 637b (as made by the input RAM request machine 650 along request line 647). A third request is for a transfer of data from the input RAM to the output RAM (as made by the output RAM request machine 651 along request line 648).

As such, at time T0, the input RAM arbiter 644 is faced with two simultaneous requests and the intermediate RAM arbiter 632 is faced with a single request. As such, on a following clock cycle, the intermediate RAM arbiter 632 causes the commencement of a burst read 1001 from the intermediate RAM; and, the input RAM arbiter 644 (having to choose between a pair of competing requests) chooses to allow the transfer of a buffer's worth of information from the input RAM to the intermediate RAM input buffer 637b (e.g., by signaling affirmatively along the Queue#_X line 646). In response, a buffer's worth of information is read 1002 from the input RAM and stored into the intermediate RAM input buffer 637b simultaneously with the burst read 1001 from the intermediate RAM.

Note that the manner of arbitration may vary from embodiment to embodiment. According to one approach, each arbiter grants service on a "first-come-first served" basis (if no participating resources are indicating they are "full" or "busy" as described in more detail below). And, for simultaneous requests, each arbiter fairly grants service over the course of operation in "round-robin" fashion. That is, referring to FIG. 10 as an example, upon the next instance where the input RAM arbiter 644 is faced with simultaneous requests (after time T1), it will grant service to the request for a transfer from input RAM to output RAM rather than the request for a transfer from input RAM to the intermediate RAM input buffer 637b (because the most recent simultaneous request was resolved in that request's favor at time T1).

As the bandwidth on the DATA_B IN bus 618b is four times that of the DATA_INT bus 620b, a transfer of a buffer's worth of information into the intermediate RAM input buffer 637b can be made in one fourth the time that is consumed burst reading a buffer's worth of information from the intermediate RAM. As such, if 16 clock cycles are consumed in burst reading 1001 a buffer's worth of information from the intermediate RAM, only four clock cycles will be consumed transferring a buffer's worth of information into the intermediate RAM input buffer 637b. As such, at time T3, the transfer to the buffer 637b is completed while the burst read 1001 from the intermediate RAM is still on-going.

Thus, by time T4, the intermediate RAM input buffer 637b is able to issue a request to the intermediate RAM arbiter 632 for a burst write into the intermediate RAM (along request line 634); and, the input RAM arbiter 644 and output RAM arbiter 645 are able to grant the request for a transfer from input RAM to output RAM (that was originally submitted as of time T1) by signaling along the appropriate lines 643, 649. Note that, in this case, the output RAM arbiter 645 was not faced with simultaneous requests because the intermediate RAM output buffer was empty as of time T1. As such, the request from the input RAM arbiter 644 (along line 643) immediately received a favorable response (as indicated at line 649). As such, a transfer 1003 of the requested information (e.g., half a burst's worth) is made from the input RAM to the output RAM begins to be made at time T4.

Note also that (e.g., because the input queues are rapidly receiving information), at time T4, a second request for a second transfer of a buffer's worth of information from the input RAM to the intermediate RAM input buffer 637b is made by the input RAM request machine 650 (e.g., along request line 647). Note, however, that because the intermediate RAM is still busy reading a buffer's worth of information 1001, the second request for another transfer of a buffer's worth of information (made at time T4) cannot be entertained because the intermediate RAM input buffer 637b is still "full" from the previous transfer 1002 made from times T2 to T3. The fact that the intermediate input RAM input buffer is full can be indicated via "full" indication line 680.

At time T6 a second request for a second transfer from the input RAM to the output RAM is made by the output RAM request machine 651 (e.g., via request line 648). Here, since the intermediate RAM output buffer 638b is not yet full from the burst read 1001 of the intermediate RAM (i.e., the burst read 1001 is not yet complete), the request made at time T6 can be immediately entertained. As such, at time T7, the transfer that was requested at time T6 commences as data begins to be transferred 1004 from the input RAM to the output RAM. Note that this transfer consumes one and half buffer's worth of information.

At time T8, the burst read 1001 from the intermediate RAM is complete; and, as a result, the intermediate RAM output buffer 638b issues a request to the output RAM arbiter 645 for a transfer from the intermediate RAM output buffer 638b to the output RAM. Here, the status of the "busy" line 682 from the output RAM request machine and address controller 651 will indicate that the transfer 1004 from input RAM to output RAM is still on going; and, as such, the request from the intermediate RAM output buffer 638b will not be immediately granted. Also, the intermediate RAM output buffer 638b will indicate (via "full" line 681) to the intermediate RAM arbiter 632 that it is not available to entertain another burst read from the intermediate RAM.

As such, should the output RAM request machine 652 request another burst read (via request line 633), it will not be granted until the intermediate RAM output buffer 638b is subsequently indicates that room exists to entertain the transfer (because a transfer of data from the intermediate RAM output buffer 638b to the output RAM has begun to occur). Nevertheless, because the burst read 1001 was completed at time T8, the request made by the intermediate RAM input buffer 637b at time T4 (for a burst write into the intermediate RAM) can be entertained. As such, at time T9, a buffer's worth of information begins to be transferred from the intermediate RAM input buffer 637b to the intermediate RAM as part of a burst write into the intermediate RAM 1005.

At time T10, the transfer 1004 from input RAM to output RAM is complete; and, the "busy" indication 649 from the output RAM request machine and address controller 651 indicates that the DATA_A OUT bus 624b is available for use. As such, the output RAM arbiter 645 will grant the request from the intermediate RAM output buffer 638b which initiates the transfer of a burst worth of information from the intermediate RAM output buffer 638b to the output RAM. Later on (not shown in FIG. 10), once the intermediate RAM input buffer 637b is within the amount of time it takes for the buffer 637b to be filled before the burst write 1005 is complete (e.g., within the last four cycles of the burst write 1005), the "full" indication 680 may be deactivated so that the request for a transfer of data into the buffer 637b made at time T4 can be granted by the input RAM arbiter 644. Similar timing can implanted between the output buffer 638b and the intermediate RAM arbiter 632 for allowance of a burst read.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a circuit description formatted in the VHSIC Hardware Description Language (VHDL) language, Verilog language or SPICE language. Some circuit description examples include: a behavioral level description, a register transfer level (RTL) description, a gate level netlist and a transistor level netlist. Machine readable media may also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
a plurality of queuing paths, each of said queuing paths further comprising an input queue, an intermediate queue and an output queue, said input queue having an output coupled to an input of said intermediate queue and an input of said output queue, said intermediate queue having an output coupled to said input of said output queue, said intermediate queue to receive data units from said input queue if a state of said input queue has reached a threshold, said output queue to receive data units from said intermediate queue if said intermediate queue has data units, said output queue to receive data units from said input queue if said intermediate queue does not have data units, wherein the input queue, the intermediate queue and the output queue are coupled to corresponding controllers, each of the corresponding controllers having arbiters for controlling bus usage for respective queues; and
an input controller in data communication with both said intermediate queue and said output queue, an intermediate controller in data communication with said intermediate queue, with said input controller configured to make a determination that a buffer's worth of information is available in said intermediate queue and the presence of sufficient memory space in said output queue to store said buffer's worth of information, with said intermediate controller configured to transfer said buffer's worth of information to said output queue in response to said determination.

2. The apparatus of claim 1 further comprising a first static random access memory to implement said input queue and a second static random access memory to implement said output queue.

3. The apparatus of claim 1 further comprising a dynamic random access memory to implement said intermediate queue, with said dynamic random access memory being selected from a set of dynamic random access memories consisting essentially of a DDR dynamic random access memory and a synchronous dynamic random access memory.

4. The apparatus of claim 1 wherein said threshold is a buffer's worth of information.

5. The apparatus of claim 1 further comprising a first static random access memory to implement said input queue, a dynamic random access memory to implement said intermediate queue, and a second static random access memory to implement said output queue.

6. The apparatus of claim 5 wherein said first static random access memory and said second static random access memory are integrated onto the same semiconductor chip.

7. An apparatus comprising:
a plurality of queuing paths, each of said queuing paths further comprising an input queue, an intermediate queue and an output queue, said input queue having an output coupled to an input of said intermediate queue and an input of said output queue, said intermediate queue having an output coupled to said input of said output queue, said intermediate queue to receive data units from said input queue if a state of said input queue has reached a threshold, said output queue to receive data units from said intermediate queue if said intermediate queue has data units, said output queue to receive data units from said input queue if said intermediate queue does not have data units, wherein the input queue, the intermediate queue and the output queue are coupled to corresponding controllers, each of the corresponding controllers having arbiters for controlling bus usage for respective queues; and
an input controller in data communication with both said input queue and said output queue, and an output controller in data communication with said output queue, with said input controller configured to make a determination of a quantity of information present in said input queue and a volume of memory space in said output queue available for storage, with said input controller and said output controller being configured to transfer an amount of said information to said output queue with said amount being a lesser value of said quantity and said volume.

8. An apparatus comprising:
a plurality of queuing paths, each of said queuing paths further comprising an input queue, an intermediate queue and an output queue, said input queue having an output coupled to an input of said intermediate queue and an input of said output queue, said intermediate queue having an output coupled to said input of said output queue, said intermediate queue to receive data units from said input queue if a state of said input queue has reached a threshold, said output queue to receive data units from said intermediate queue if said intermediate queue has data units, said output queue to receive data units from said input queue if said intermediate queue does not have data units, wherein the input queue, the intermediate queue and the output queue are coupled to corresponding controllers, each of the corresponding controllers having arbiters for controlling bus usage for respective queues; and
an input controller in data communication with said input queue, said intermediate queue and said output queue, with said input controller configured to make a determination of a quantity of information present in said input queue and a volume of memory space in said output queue available for storage, and whether said intermediate queue has information for transfer to said output queue, with said input controller and said output controller being configured to transfer an amount of said information to said output queue with said amount being a lesser value of said quantity and said volume in response to said input controller determining a buffer's worth of information is not present in said intermediate queue.

9. A semiconductor chip, comprising:
a first random access memory, having an output, to implement an input queue;
a second random access memory to implement an output queue;
an interface to a third random access memory, said third random access memory to implement an intermediate queue
a first data path from said first random access memory to said interface to help transport a first data unit from said input queue to said intermediate queue;
a second data path from said first random access memory to said second random access memory to help transport a second data unit from said input queue to said output queue; and
a third data path from said interface to said second random access memory to help transport said first data unit from said intermediate queue to said output queue, the first, second, and third random access memories are coupled to corresponding controllers, each of the corresponding controllers having arbiters for controlling bus usage for respective memories, with a portion of said first and second data paths being in constant data communication with said output during transfer of said first and second data units, a first of said controllers being in data communication with both said third random access memory and said second random access memory, and a second of said controllers is in data communication with said third random access memory, with said first controller being configured to make a determination that a buffer's worth of information is available in said third random access memory and the presence of sufficient memory space in said second random access memory to store said buffer's worth of information, with said second controller being configured to transfer said buffer's worth of information to said second random access memory in response to said determination, with said third random access memory comprising a dynamic random access memory selected from a set of memories consisting essentially of a DDR dynamic random access memory and a synchronous dynamic random access memory.

10. The semiconductor chip of claim 9 wherein said first random access memory further comprises a static random access memory.

11. The semiconductor chip of claim 9 wherein said second random access memory further comprises a static random access memory.

12. The semiconductor chip of claim 9 wherein said first data unit is a buffer's worth of memory.

13. The semiconductor chip of claim 9 wherein said first random access memory further comprises a first static random access memory and said second random access memory further comprises a second static random access memory.

14. The semiconductor chip of claim 9 wherein said semiconductor chip further comprises network processing logic that performs a look-up based upon a packet header.

15. The apparatus of claim 9 wherein said first data unit is of a size that corresponds to a burst write to said third random access memory.

16. The apparatus of claim 9 wherein said first data unit is of a size that corresponds to a burst read from said third random access memory.

17. The apparatus of claim 9 further comprising a buffer along said first data path.

18. The apparatus of claim 9 further comprising a buffer along said third data path.

19. The apparatus of claim 9 further comprising a multiplexer that helps form either said second data path or said third data path in response to said multiplexer's channel select input value.

20. A semiconductor chip comprising:
a first random access memory, having an output, to implement an input queue;
a second random access memory to implement an output queue;
an interface to a third random access memory, said third random access memory to implement an intermediate queue, with a first data path from said first random access memory to said interface to help transport a first data unit from said input queue to said intermediate queue;
a second data path from said first random access memory to said second random access memory to help transport a second data unit from said input queue to said output queue; and
a third data path from said interface to said second random access memory to help transport said first data unit from said intermediate queue to said output queue, the first, second, and third random access memories are coupled to corresponding controllers, each of the corresponding controllers having arbiters for controlling bus usage for respective memories, with a portion of said first and second data paths being in constant data communication with said output during transfer of said first and second data units, with a first of said controllers being in data communication with both said first random access memory and said second random access memory, and a second of said controllers is in data communication with said second random access memory, with said first controller configured to make a determination that a quantity of information is available in said first random access memory and a volume of memory spaced in said second random access memory available for storage, with said first controller and said second controller being configured to transfer an amount of said information to said second random access memory, with said amount being a lesser value of said quantity and said volume.

21. A semiconductor chip comprising:
a first random access memory, having an output, to implement an input queue;
a second random access memory to implement an output queue;
an interface to a third random access memory, said third random access memory to implement an intermediate queue;
a first data path from said first random access memory to said interface to help transport a first data unit from said input queue to said intermediate queue;
a second data path from said first random access memory to said second random access memory to help transport a second data unit from said input queue to said output queue; and
a third data path from said interface to said second random access memory to help transport said first data unit from said intermediate queue to said output queue, the first, second, and third random access memories are coupled to corresponding controllers, each of the corresponding controllers having arbiters for controlling bus usage for respective memories, with a portion of said first and second data paths being in constant data communication with said output during transfer of said first and second data units; and
network processing logic that performs a look-up based upon a packet header, with a first of said controllers is in data communication with said first random access memory, said second random access memory and said third random access memory, and a second of said controllers is in data communication with said second random access memory, with said first controller being configured to make a determination that a quantity of information is available in said first random access memory and a volume of memory spaced in said second random access memory available for storage, with said first controller and said second controller being configured to transfer an amount of said information to said second random access memory, with said amount being a lesser value of said quantity and said volume in response to said input controller determining a buffer's worth of information is not present in said intermediate queue.

* * * * *